United States Patent
Shu et al.

(10) Patent No.: US 11,544,527 B2
(45) Date of Patent: Jan. 3, 2023

(54) FUZZY CYBER DETECTION PATTERN MATCHING

(71) Applicant: International Business Machines Corporation, Armonk, NY (US)

(72) Inventors: Xiaokui Shu, Ossining, NY (US); Zhongshu Gu, Ridgewood, NJ (US); Marc P. Stoecklin, Richterswil (CH); Hani T. Jamjoom, Cos Cob, CT (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 16/783,274

(22) Filed: Feb. 6, 2020

(65) Prior Publication Data
US 2021/0248443 A1    Aug. 12, 2021

(51) Int. Cl.
*G06N 3/04* (2006.01)
*G06F 16/9035* (2019.01)
(Continued)

(52) U.S. Cl.
CPC ....... *G06N 3/0436* (2013.01); *G06F 16/9017* (2019.01); *G06F 16/9024* (2019.01);
(Continued)

(58) Field of Classification Search
CPC .. G06N 3/0436; G06N 3/049; G06F 16/9017; G06F 16/9024; G06F 16/9035;
(Continued)

(56) References Cited

U.S. PATENT DOCUMENTS

| 7,624,448 B2 * | 11/2009 | Coffman | H04L 63/1416 726/22 |
| 11,227,014 B2 * | 1/2022 | Leskovec | G06K 9/6276 |

(Continued)

FOREIGN PATENT DOCUMENTS

| CN | 105138601 A | * 12/2015 | ............. G06F 16/50 |
| CN | 105138601 A |   12/2015 | |

(Continued)

OTHER PUBLICATIONS

International Search Report and Written Opinion dated Mar. 1, 2021 for International Application No. PCT/EP2020/083530, 14 pages.
(Continued)

*Primary Examiner* — Giovanna B Colan
(74) *Attorney, Agent, or Firm* — Stephen J. Walder, Jr.; Jeffrey S. LaBaw

(57) ABSTRACT

Mechanisms for identifying a pattern of computing resource activity of interest, in activity data characterizing activities of computer system elements, are provided. A temporal graph of the activity data is generated and a filter is applied to the temporal graph to generate one or more first vector representations, each characterizing nodes and edges within a moving window defined by the filter. The filter is applied to a pattern graph representing a pattern of entities and events indicative of the pattern of interest, to generate a second vector representation. The second vector representation is compared to the one or more first vector representations to identify one or more nearby vectors, and one or more corresponding subgraph instances are output to an intelligence console computing system as inexact matches of the temporal graph.

20 Claims, 26 Drawing Sheets

(51) Int. Cl.
*G06F 16/901* (2019.01)
*G06K 9/62* (2022.01)

(52) U.S. Cl.
CPC ....... *G06F 16/9035* (2019.01); *G06K 9/6296* (2013.01); *G06N 3/049* (2013.01)

(58) Field of Classification Search
CPC .... G06F 21/554; G06F 21/577; G06F 21/552; G06K 9/6296; H04L 63/1416; H04L 63/1425
USPC .................................................. 707/2; 706/2
See application file for complete search history.

(56) References Cited

U.S. PATENT DOCUMENTS

| | | | | |
|---|---|---|---|---|
| 2009/0037772 | A1* | 2/2009 | Wegerich | G06N 5/025 714/E11.002 |
| 2015/0339570 | A1* | 11/2015 | Scheffler | G06N 3/04 706/27 |
| 2017/0346839 | A1* | 11/2017 | Peppe | G06F 21/552 |
| 2019/0354689 | A1* | 11/2019 | Li | G06N 3/04 |

FOREIGN PATENT DOCUMENTS

| | | | |
|---|---|---|---|
| CN | 107545791 | A * | 1/2018 |
| CN | 107545791 | A | 1/2018 |

OTHER PUBLICATIONS

Bruna, Joan et al., "Spectral Networks and Locally Connected Networks on Graphs", arXiv: 1312.6203v1 [cs.LG], Dec. 21, 2013, 14 pages.
Hamilton, William L. et al., "Inductive Representation Learning on Large Graphs", 31st Conference on Neural Information Processing Systems (NIPS2017, Dec. 4-9, 2017, 11 pages.
Li, Yujia et al., "Gated Graph Sequence Neural Networks", ICLR 2016, arXIV: 1511.05493v4 [cs.LG], Sep. 22, 2017, 20 pages.
Scarselli, Franco et al., "The Graph Neural Network Model", IEEE Transactions on Neural Networks, vol. 20, No. 1, Jan. 2009, pp. 61-80 (20 pages).
Schales, Douglas L. et al., "FCCE: Highly scalable distributed Feature Collection and Correlation Engine for low latency big data analytics", 2015 IEEE 31st International Conference on Data Engineering, Apr. 13-17, 2015, pp. 1316-1327 (12 pages).
Shu, Xiaokui et al., "Endpoint Inter-Process Activity Extraction and Pattern Matching", filed Oct. 12, 2018, U.S. Appl. No. 16/158,798.
Shu, Xiaokui et al., "Iterative Constraint Solving in Abstract Graph Matching for Cyber Incident Reasoning", filed Oct. 12, 2018, U.S. Appl. No. 16/158,863.
Shu, Xiaokui et al., "Multi-Point Causality Tracking in Cyber Incident Reasoning", filed Oct. 12, 2018, U.S. Appl. No. 16/158,725.
Shu, Xiaokui et al., "Threat Intelligence Computing", Proceedings of the 2018 ACM SIGSAC Conference on Computer and Communications Security (CCS'18), Oct. 15-19, 2018, pp. 1883-1898 (16 pages).

* cited by examiner

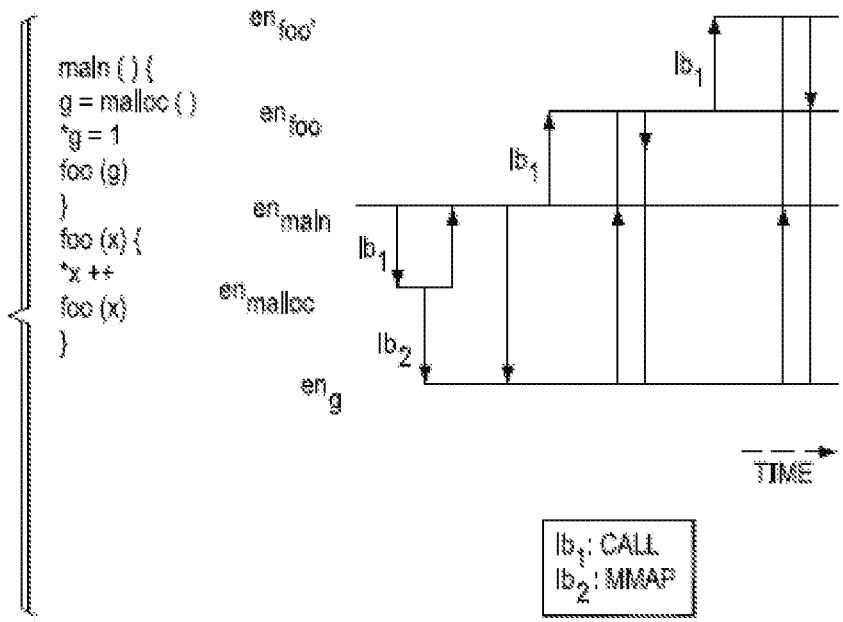
FIG. 17
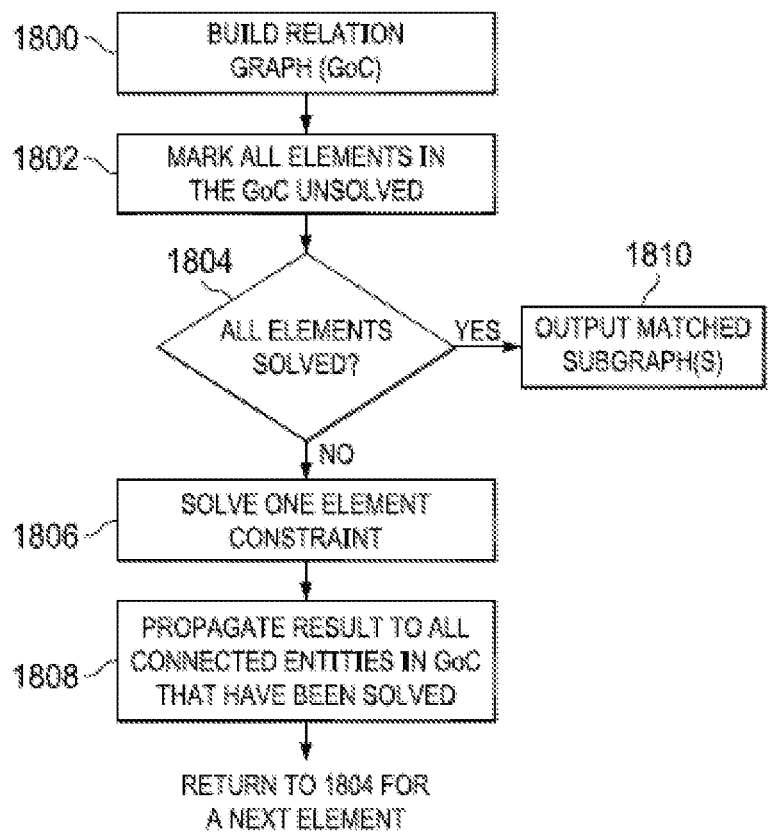

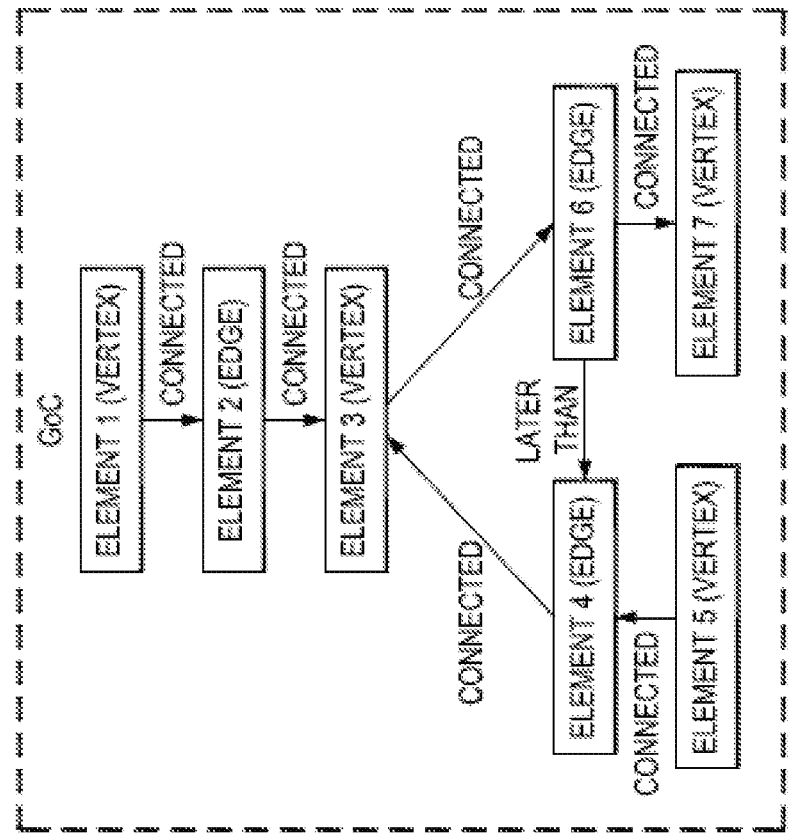
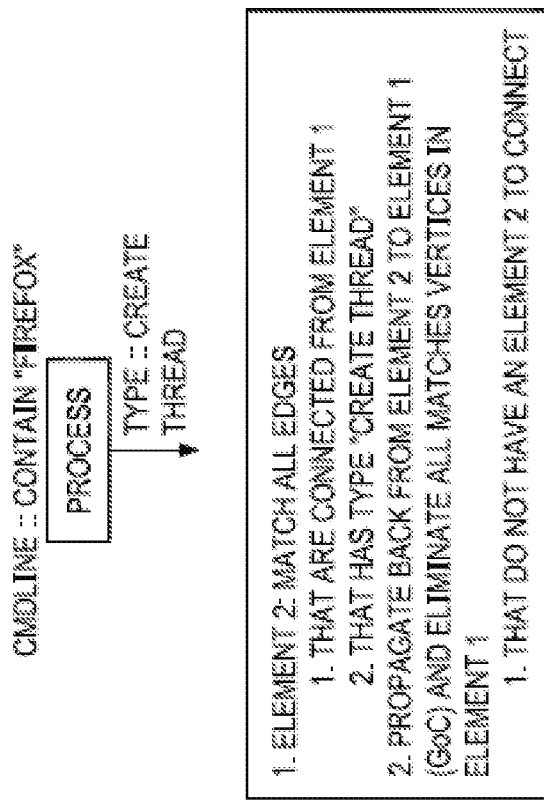
FIG. 21

FUZZY CYBER DETECTION PATTERN MATCHING

This invention was made with government support under Contract No. FA8650-15-C-7561 awarded by Defense Advanced Research Projects Agency (DARPA). The government has certain rights to this invention.

BACKGROUND

The present application relates generally to an improved data processing apparatus and method and more specifically to mechanisms for fuzzy cyber detection pattern matching.

Emerging cyberattacks, such as advanced persistent threat (APT), have become increasingly stealthy and sophisticated, usually involving inter-operation of multiple processes. To achieve their attack goals, such comprehensive attack campaigns usually consist of long attack paths/vectors that exploit multiple processes on a single host, or on multiple hosts. Thus, understanding inter-process behavior is important to identifying attacks and reducing false alarms.

Attack/intrusion detection products, systems and services are well-known. Most host-based and network-based attack/intrusion detection products utilize a static signature matching approach. For example, anti-virus products, firewalls, intrusion detection systems (IDS), and the like, rely on concrete binary or network communication signatures to identify attacks. With these products, the detection procedure includes: (i) attack discovery, (ii) signature selection, (iii) signature distribution, and (iv) endpoint signature matching.

Intra-process behavior modeling and detection also is well-known, as evidenced by program anomaly detection literature, as well as most state-of-the-art commercial endpoint intrusion detection products. These mechanisms basically monitor system events, e.g., system calls and/or Windows APIs of each process, and then decide whether the process is malicious based on its behavior model. A solution of this type can be nullified when stealthy attacks are implemented across processes, or when the attacker leverages benign processes to achieve attack goals. Although the above-described approaches provide advantages, they often cannot detect new or rapidly updated attacks in a timely manner or provide sufficient attack surface coverage with respect to attacks that leverage inter-process activities.

Some behavior-based endpoint detection products attempt to address these deficiencies by attempting to model direct inter-process activities, such as process spawning, and malware downloading. While inter-process activity modeling of this type is useful, the known solutions operate on an ad hoc basis, with only a small amount of direct inter-process activity being modeled due to practicality constraints in existing products. Moreover, these approaches do not address indirect inter-process activities. Thus, even where some inter-process activity modeling is available, an attacker can circumvent the detection, e.g., by constructing stealthy attacks with multiple processes and files in a large time window.

One example of such an attack was the recent Target® stores data breach, during which breached data from point-of-sale machines was encrypted onto disk but later read by another process at the working time for aggregation. In this circumstance, the indirect inter-process activities (between the processes that wrote and read the encrypted files) were not explicit, and thus were not identified and mitigated. That is, existing work for cyber incident reasoning focuses either on the exact match of signatures, or on regular expression-based string matching.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for identifying a pattern of computing resource activity of interest, in activity data characterizing activities of computer system elements. The method comprises receiving, by the data processing system, the activity data characterizing activities of computer system elements from one or more computing devices of a monitored computing environment, and generating, by the data processing system, a temporal graph of the activity data. The temporal graph comprises nodes representing the computer system elements and edges connecting nodes, where each edge represents an event occurring between computer system elements represented by nodes connected by the edge.

The method further comprises applying, by the data processing system, a filter to the temporal graph to generate one or more first vector representations, each vector representation characterizing nodes and edges within a moving window defined by the filter. The method also comprises applying, by the data processing system, the filter to a pattern graph representing a pattern of entities and events between entities indicative of the pattern of computing resource activity to be identified in the temporal graph. Application of the filter to the pattern graph creates a second vector representation. In addition, the method comprises comparing, by the data processing system, the second vector representation to the one or more first vector representations to identify one or more nearby vectors in the one or more first vector representations, and outputting, by the data processing system, one or more subgraph instances corresponding to the identified one or more nearby vectors to an intelligence console computing system as inexact matches of the temporal graph.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 17 depicts a representative activity graph for process level activities in accordance with one illustrative embodiment;

FIG. 18 depicts the iterative constraint solving algorithm as a process flow in accordance with one illustrative embodiment;

FIGS. 20-23 depict application of the iterative constraint solving process or algorithm of one illustrative embodiment with respect to the pattern graph of FIG. 19;

DETAILED DESCRIPTION

Figure 1:
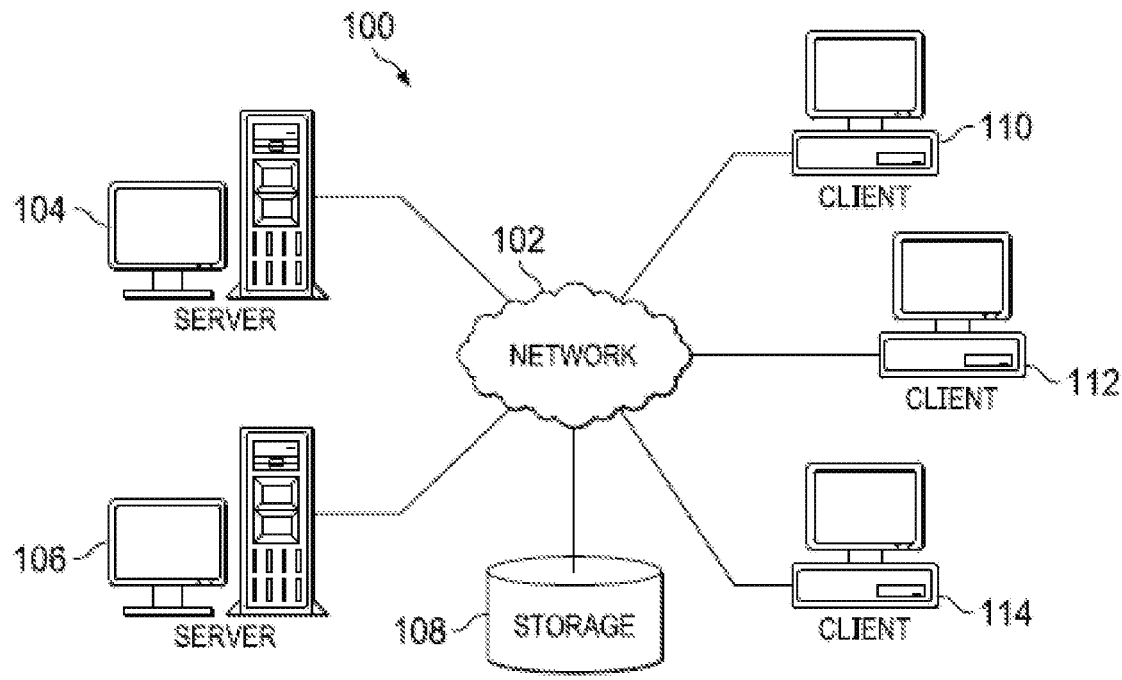
FIG. 1 depicts an exemplary block diagram of a distributed data processing environment in which exemplary aspects of the illustrative embodiments may be implemented.

The illustrative embodiments provide mechanisms for implementing fuzzy cyber detection pattern matching. As discussed above, known approaches to attack/threat detection have various drawbacks. In addition to the above drawbacks, it should also be noted that these known approaches do not deal with abstract graph patterns, which are a category of high-level behavior description of malicious/interesting behaviors. That is, the monitored computational activities of computing devices may be represented as a temporal graph which the mechanisms of the illustrative embodiments may use as a basis for performing fuzzy pattern matching to detect cyber attacks. The temporal graph may indicate, for instances of time along one axis, the particular computing components and their interactions occurring at that time instance, for example.

Abstract graph pattern matching may be used in behavior-based threat detection and cyber hunting. That is, with abstract graph pattern matching, given an abstract pattern, such as a process creating a thread into another process, for example, a graph pattern matching algorithm may be used to search the temporal graph for the monitored host to find matching activities. Matched activities can then be returned for further inspection, e.g., inspection by security analysts or threat hunters. In addition, advanced abstract patterns, such as "a specific file flows to any network sockets in n steps," may be evaluated and used for detecting data exfiltration.

More generally, an abstract graph pattern can be thought of as elements with constraints (or predicate expressions) and connections among them. Pattern matching requires satisfying all constraints of all elements, as well as how they are connected. This task is computationally non-trivial because a pattern can refer to other patterns via parameters, and because graphs are typically stored on distributed external storage, making it expensive to check data associated with each predicate.

Abstract graph pattern matching, in some illustrative embodiments described herein, involves exact sub-graph matching. That is, given a computation graph (CG), or temporal graph of the execution of computer states at various levels (see examples in FIGS. 15-17 hereafter), abstract graph pattern matching, as described hereafter, will attempt to exactly match a pattern graph (PG) for an attack or threat with a portion or sub-graph in the CG. In this way, potential cyber attacks or threats may be identified based on the abstract graph pattern matching. However, some cyber attacks or threats may be devised in which exact pattern matching will not necessarily identify instances of such attacks or threats, e.g., there is not enough information about the cyber attack/threat to generate a PG for that cyber attack/threat. For such situations, the mechanisms of the illustrative embodiments, as described hereafter, also provide a fuzzy or inexact pattern matching computer mechanism that is able to utilize neural networks and machine learning to learn the patterns for cyber attacks/threats and use them to identify potential attacks/threats present in temporal graphs of computing system activities, such as the computation graph (CG) mentioned previously.

Figure 2:
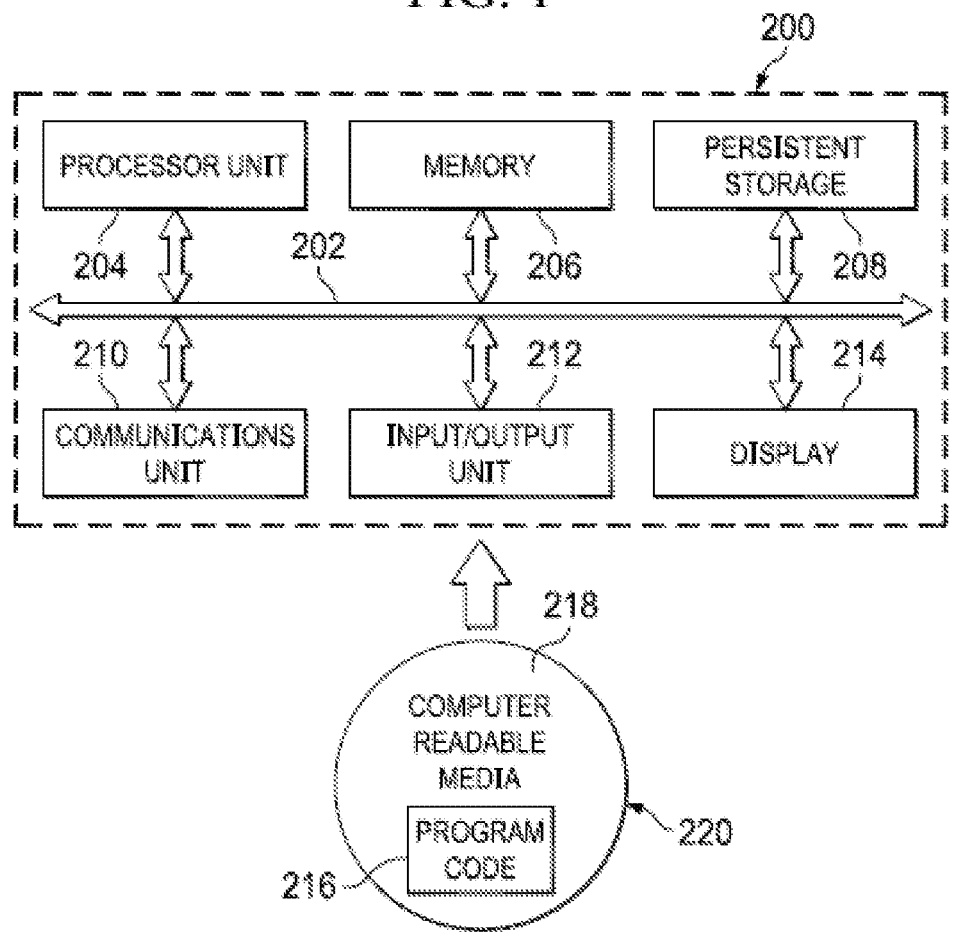
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the present invention may be implemented. It should be appreciated that FIGS. 1-2 are only exemplary, and they are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts an exemplary distributed data processing system. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables. In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type. Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device.

Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208. Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Additionally, a communications unit may include one or more devices used to transmit and receive data, such as a modem or a network adapter. Further, a memory may be, for example, memory 206 or a cache such as found in an interface and memory controller hub that may be present in communications fabric 202. Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter. As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal.

Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Security Intelligence Platform with Incident Forensics

Figure 3:
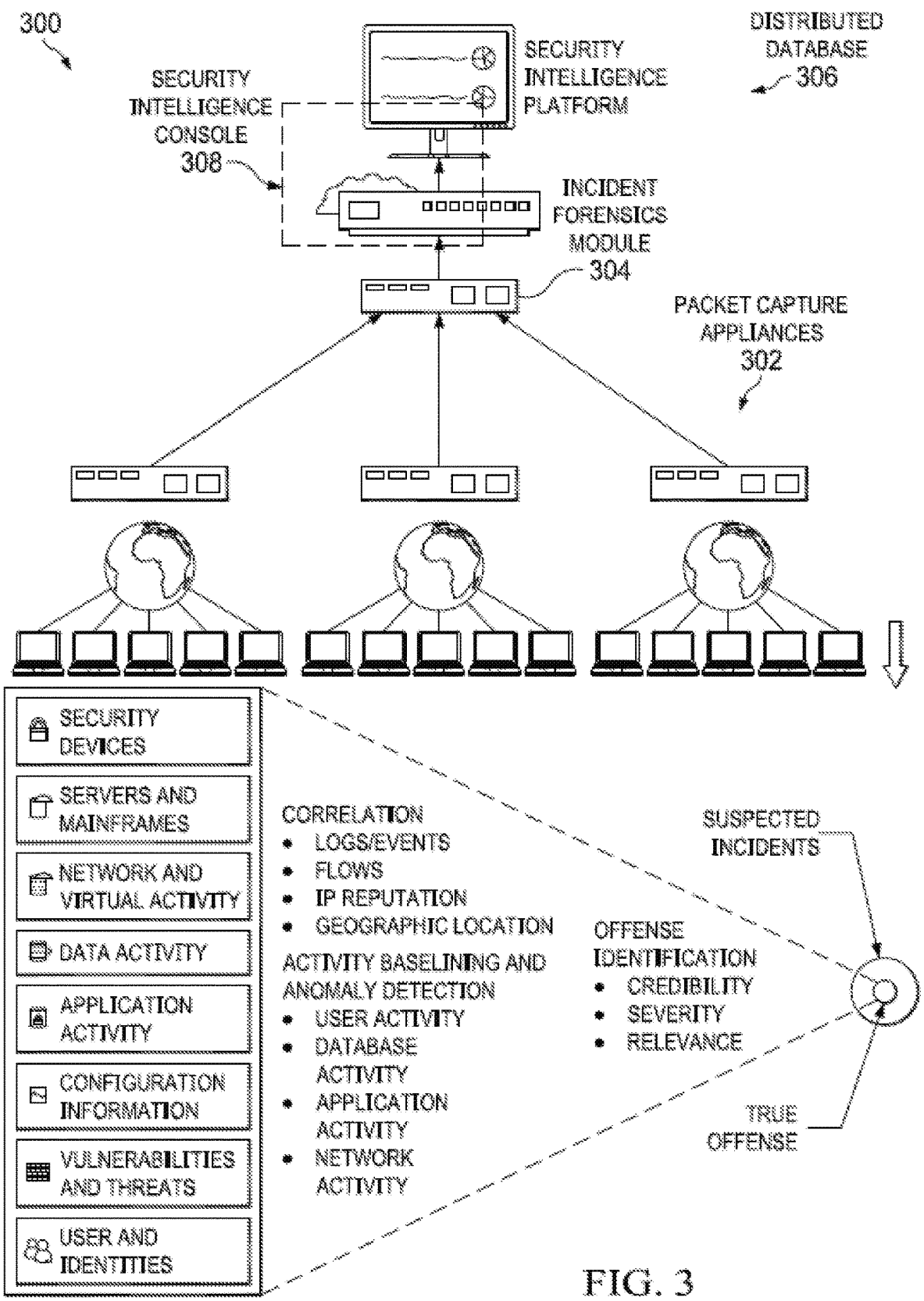
FIG. 3 illustrates a security intelligence platform in which the techniques of one or more illustrative embodiments may be practiced.

A representative security intelligence platform in which techniques of one or more illustrative embodiments may be practiced is illustrated in FIG. 3. Generally, the platform provides search-driven data exploration, session reconstruction, and forensics intelligence to assist security incident investigations. In pertinent part, the platform 300 comprises a set of packet capture appliances 302, an incident forensics module appliance 304, a distributed database 306, and a security intelligence console 308. The packet capture appliances 302 and incident forensics module appliance 304 are configured as network appliances, but may also be configured as virtual appliances. The packet capture appliances 302 are operative to capture packets off a network, such as network 102 in FIG. 1, using known, or later developed, packet capture (pcap) application programming interfaces (APIs) or other known/later developed techniques. The packet capture appliances 302 also provide such data (e.g., real-time log event and network flow) to the distributed database 306, where the data is stored and available for analysis by the forensics module 304 and the security intelligence console 308. The packet capture appliances 302 operate in a session-oriented manner, capturing all packets in a flow, and indexing metadata and payloads to enable fast search-driven data exploration.

The database 306 provides a forensics repository, with distributed and heterogeneous data sets comprising the information collected by the packet capture appliances 302. The console 308 provides a web or cloud-accessible user interface (UI) that exposes a "Forensics" dashboard tab to facilitate an incident investigation workflow by an investigator. Using the dashboard, an investigator selects a security incident. The incident forensics module 304 retrieves all the packets (including metadata, payloads, etc.) for a selected security incident and reconstructs the session for analysis.

A representative commercial product that implements an incident investigation workflow of this type is IBM® Security QRadar® Incident Forensics V7.2.3 (or higher). Using this platform, an investigator searches across the distributed and heterogeneous data sets stored in the database, and receives a unified search results list. The search results may be merged in a grid, and they can be visualized in a "digital impression" tool so that the user can explore relationships between identities.

Typically, an appliance for use in the above-described system is implemented as a network-connected, non-display device. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. A network appliance of this type typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk.

Figure 4:
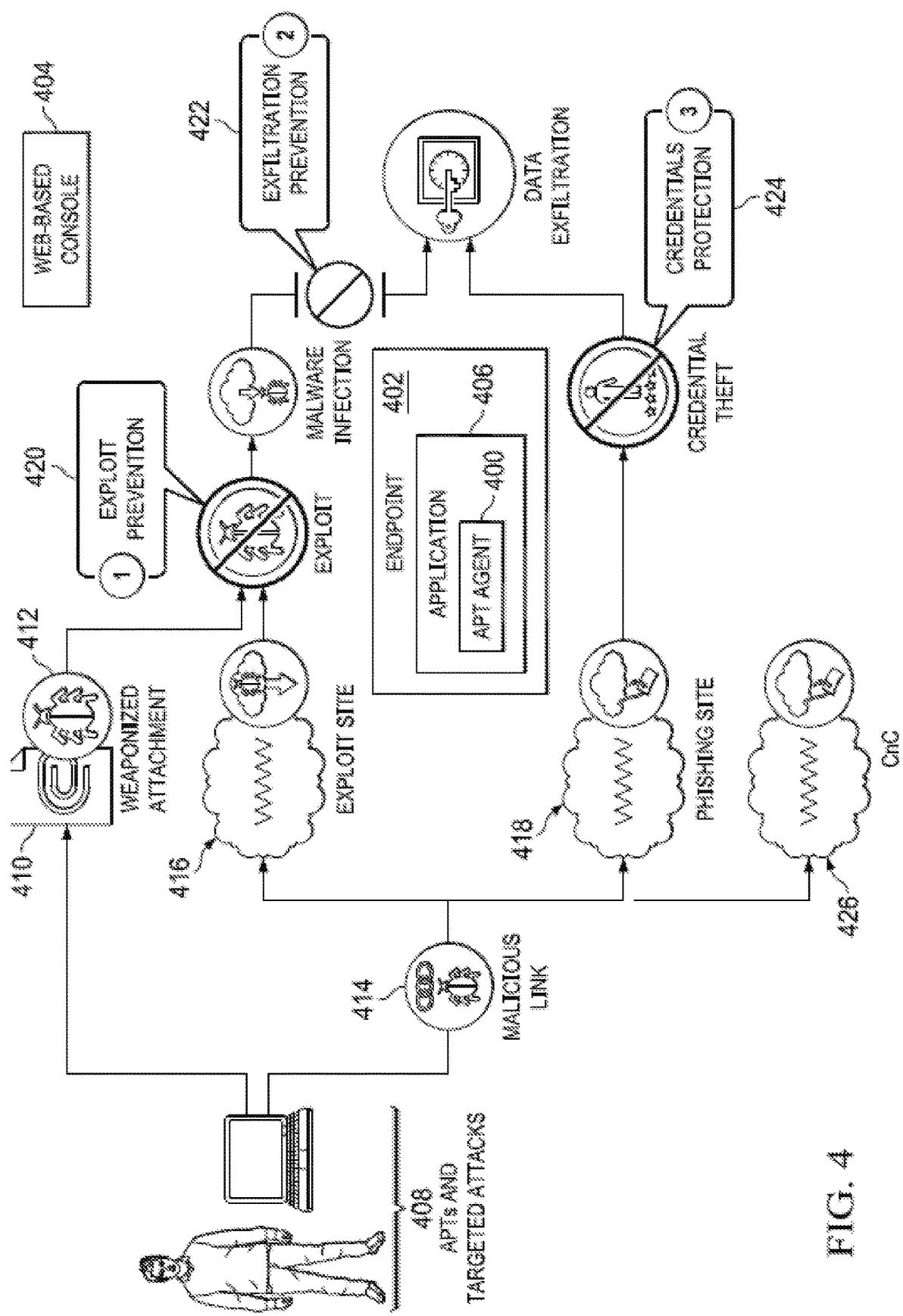
FIG. 4 depicts an Advanced Persistent Threat (APT) platform in which the techniques of one or more illustrative embodiments may be practiced.

An appliance of this type can facilitate Security Information Event Management (SIEM). For example, IBM® Security QRadar® SIEM is an enterprise solution that includes packet data capture appliances that may be configured as appliances of this type. Such a device is operative, for example, to capture real-time Layer 4 network flow data from which Layer 7 application payloads may then be analyzed, e.g., using deep packet inspection and other technologies. IBM® Security QRadar® SIEM provides situational awareness and compliance support using a combination of flow-based network knowledge, security event correlation, and asset based vulnerability assessment. In a basic IBM® Security QRadar® SIEM installation, the system such as shown in FIG. 4 is configured to collect event and flow data, and generate reports. A user (e.g., an SOC analyst) can then investigate offenses to determine the root cause of a network issue.

Generalizing, Security Information and Event Management (SIEM) tools provide a range of services for analyzing, managing, monitoring, and reporting on IT security events and vulnerabilities. Such services typically include collection of events regarding monitored accesses and unexpected occurrences across the data network, and analyzing them in a correlative context to determine their contribution to profiled higher-order security events. SIEM tools may also include analysis of firewall configurations, network topology and connection visualization tools for viewing current and potential network traffic patterns, correlation of asset vulnerabilities with network configuration and traffic to identify active attack paths and high-risk assets, and support of policy compliance monitoring of network traffic, topology and vulnerability exposures. Some SIEM tools have the ability to build up a topology of managed network devices such as routers, firewalls, and switches based on a transformational analysis of device configurations processed through a common network information model. The result is a locational organization which can be used for simulations of security threats, operational analyses of firewall filters, and other applications. The primary device criteria, however, are entirely network- and network-configuration based. While there are a number of ways to launch a discovery capability for managed assets/systems, and while containment in the user interface is semi-automatically managed (that is, an approach through the user interface that allows for semi-automated, human-input based placements with the topology, and its display and formatting, being data-driven based upon the discovery of both initial configurations and changes/deletions in the underlying network), nothing is provided in terms of placement analytics that produce fully-automated placement analyses and suggestions.

Advanced Persistent Threat (APT) Prevention

APT mitigation and prevention technologies are well-known. For example, IBM® Trusteer Apex® is an automated solution that prevents exploits and malware from compromising enterprise endpoints and extracting information. A solution of this type typically provides several layers of security, namely, exploit prevention, data exfiltration prevention, and credentials protection.

FIG. 4 depicts a typical embodiment, wherein the APT solution is architected generally as agent code 400 executing in enterprise endpoint 402, together with a web-based console 404 that enables IT security to manage the deployment (of both managed and unmanaged endpoints) from a central control position. The agent code 400 operates by monitoring an application state at the time the application 406 executes sensitive operations, e.g., writing a file to the file system. Generally, the agent 400 uses a whitelist of legitimate application states to verify that the sensitive operation is executed (or not) under a known, legitimate state. An exploit will attempt to execute sensitive operations under an unknown (not whitelisted) state, thus it will be stopped. The approach enables the APT agent to accurately detect and block both known and zero-day exploits, without knowing anything about the threat or the exploited vulnerability. The "agent" may be any code-based module, program, process, component, thread or the like.

FIG. 4 depicts how APT attacks typically unfold and the points at which the APT solution is operative to stop the intrusion. For example, here the attacker 408 uses a spear phishing email 410 to send a user a weaponized document, i.e. one that contains hidden exploit code 412. When the user opens the document with a viewer, such as Adobe® Acrobat® or Microsoft® Word, the exploit code runs and attaches to an application vulnerability to silently download malware on the employee computer 402. The user is never aware of this download. Another option is to send a user a link 414 to a malicious website 416 that contains an exploit code or a legitimate website that was compromised (e.g., through a watering hole attack). When the user clicks the link and the browser renders the HTML content, the exploit code runs and latches onto a browser (or browser plug-in) vulnerability to silently download malware on the user's computer. The link can also direct the user to a phishing site (like a fake web app login page) 418 to convince the user to submit corporate credentials. After infecting the computer 402 with advanced malware or compromising corporate credentials, the attacker 408 has established a foothold within the corporate network and then can advance the attack.

As depicted, the agent 400 protects the enterprise against such threats at several junctions: (1) exploit prevention 420 that prevents exploiting attempts from compromising user computers; (2) exfiltration prevention 422 that prevents malware from communicating with the attacker and sending out information if the machine is already infected with malware; and (3) credentials protection 424 that prevent users from using corporate credentials on non-approved corporate sites (including phishing or and public sites like social networks or e-commerce, for example). In one known approach, the agent 400 performs these and related operations by monitoring the application and its operations using a whitelist of legitimate application states.

Information stealing malware can be directly installed on endpoints by the user without requiring an exploit. To exfiltrate data, typically the malware must communicate with the Internet directly or through a compromised application process. Advanced malware uses a few evasion techniques to bypass detection. For example, information stealing malware compromises another legitimate application process and might communicate with the attacker over legitimate websites (like Forums and Google® Docs). The agent 400 is also operative to stop the execution of untrusted code that exhibits data exfiltration states. To this end, preferably the agent 400 validates that only trusted programs are allowed to use data exfiltration techniques to communicate with external networks. The agent 400 preferably uses several techniques to identify unauthorized exfiltration states and malicious communication channels, and blocks them. Because the agent 400 monitors the activity on the host itself, it has good visibility and can accurately detect and block these exfiltration states.

The references herein to the identified commercial products is not intended to be limiting, as the approach herein may be implemented with any APT solution or functionality (even if embedded in other systems).

Endpoint Inter-Process Activity Extraction and Pattern Matching

Figure 5:
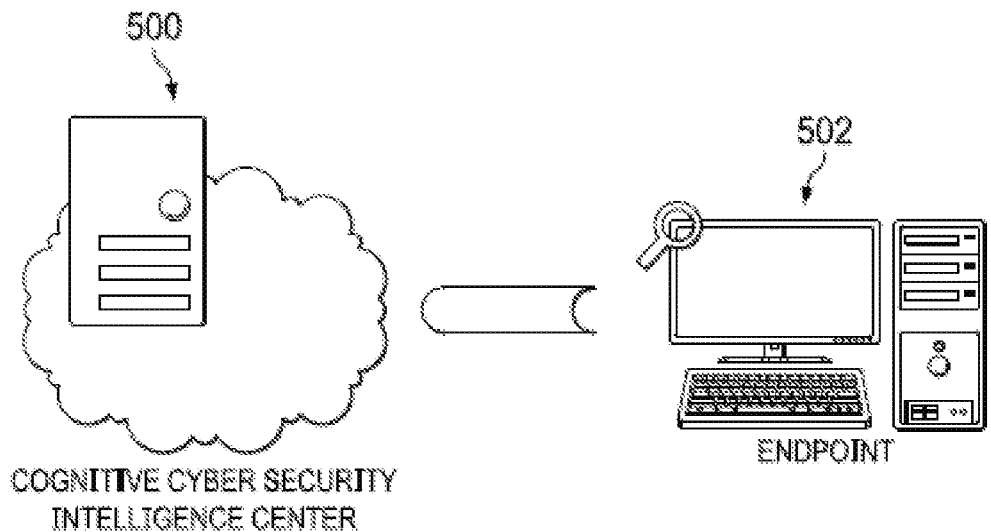
FIG. 5 illustrates an operating environment in which a cognitive cybersecurity intelligence center is used to manage an endpoint machine and in which the techniques of one or more illustrative embodiments may be implemented.

With the above in mind, FIG. 5 depicts a basic operating environment that includes a cognitive cybersecurity intelligence center 500, and an endpoint 502. An endpoint 502 is a networked data processing system or device, such as the data processing system shown in FIG. 2, that runs systems management code (software) that enables management and monitoring of the endpoint by the intelligence center 500. The intelligence center 500 may be implemented as a security management platform such as depicted in FIG. 3, in association with an APT solution such as depicted in FIG. 4, or in other management solutions. Thus, for example, known commercial products and systems that provide endpoint management include IBM® BigFix®, which provides system administrators with remote control, patch management, software distribution, operating system deployment, network access protection and hardware and software inventory functionality. A commercial system of this type may be augmented to include the endpoint inter-process activity extraction and pattern matching techniques of one or more of the illustrative embodiments described herein, including the fuzzy cyber detection pattern matching mechanisms described hereafter, or such techniques may be implemented in a product or system dedicated for this purpose.

The endpoint 502, in some illustrative embodiments, is a physical or virtual machine or device running an operating system such as Microsoft® Windows®, Mac OS X®, Vmware ESX®, Linux®, Unix®, as various mobile operating systems such as Microsoft® Windows Phone®, Symbian®, Apple iOS® and Google® Android®. The cognitive cybersecurity intelligence center 500 operates as a network-accessible security management platform comprising a plurality of machines and application software. The cognitive cybersecurity intelligence center 500 supports cybersecurity analytics, e.g., using machine learning and the like. The cognitive cybersecurity intelligence center 500 may operate in a dedicated manner to support a plurality of endpoints, or "as-a-service" on behalf of multiple enterprises, each having their own endpoints 502. Typically, endpoint machines communicate with the intelligence center in a client-server paradigm, such as depicted in FIG. 1 and described above. The intelligence center may be located and accessed in a cloud-based operating environment.

As will be described, according to one or more illustrative embodiments, inter-process events are sent from endpoints, such as endpoint 502, to a detection server executing the cognitive cybersecurity intelligence center 500, where such events are analyzed. Attack or threat detection occurs in the detection server. As will be seen, the approach according to one or more illustrative embodiments as described herein provides for an efficient, systematic (as opposed to merely ad hoc) mechanism to record endpoint activities via inter-process events, to describe a malicious or suspicious behavior of interest with abstractions (network graphs), and to match concrete activities (as represented in the recorded events) with abstract patterns. Moreover, in accordance with some illustrative embodiments, the approach according to some illustrative embodiments may include a fuzzy cyber detection pattern matching functionality. The pattern matching of the illustrative embodiments enables the cognitive cybersecurity intelligence center 500 to act upon malicious/suspicious behaviors (e.g., by halting involved processes, alerting, dropping on-going network sessions, halting on-going disk operations, and the like), as well as to assist security analysts to locate interesting activities (e.g., threat hunting) or to determine a next step that may be implemented in a workflow to address the suspect or malicious activity.

According to one technique herein, both direct and indirect inter-process activities are extracted at endpoints and compared with pre-defined malicious behavior patterns for detection. Direct and indirect inter-process activities may include control flow, such as process spawn, and information exchange via channels, such as files, sockets, messages, shared memory, and the like. Inter-process activities reveal goals of processes and their particular execution paths. In one approach herein, inter-process activities are matched against malicious inter-process behaviors for detecting attack instances. In some illustrative embodiments, the malicious behavior patterns are pre-defined with abstraction to characterize key steps in cyberattacks. These malicious behavior patterns may be stored in an endpoint, and can be updated as necessary.

Figure 6:
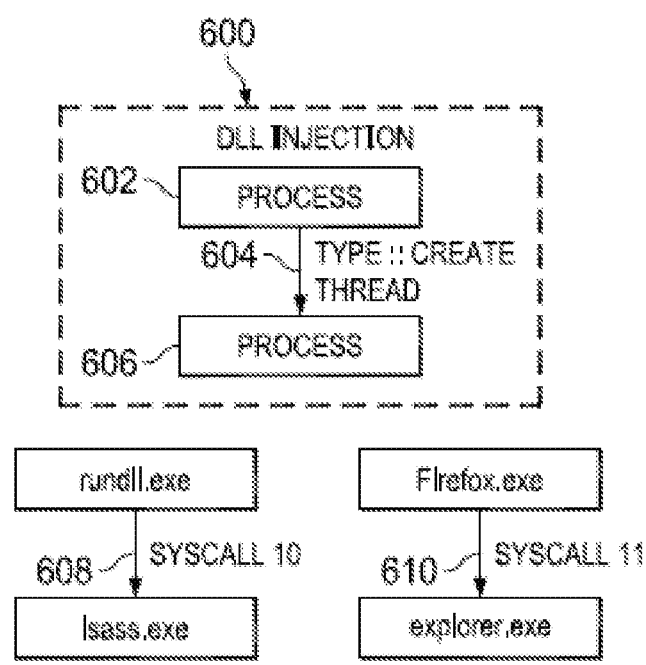
FIG. 6 depicts a representative malicious behavior graph abstraction, and several inter-process activity graphs that are matched to the graph abstraction in accordance with one illustrative embodiment.

FIG. 6 depicts how graphs are used to facilitate behavior-based detection/reasoning according to the techniques of one or more illustrative embodiments described herein. In this approach, an individual (e.g., a software developer, a security analyst, or the like) describes a malicious or interesting behavior in an abstract graph pattern 600, also referred to as a pattern graph (PG). In the depicted example of a malicious behavior, a DLL injection attack is modeled by a process 602 that executes an event (Type::create thread) 604, which then spawns another process 606. Generalizing, the graph pattern 600 comprises nodes (in this example processes 602 and 606), and edges (in this example, the event 604 that links the two nodes). In operation, a pattern matching algorithm may then return concrete activities on a host endpoint that match the pattern defined in the graph pattern 600 (or PG). The concrete activities on the endpoint are also modeled by graphs to facilitate pattern matching. Two such example activity graphs 608 and 610 derived from the endpoint inter-process activity and that match the abstract graph behavior 600 are depicted. In the first example activity graph 608, process rundll.exe executing event Syscall 10 spawns process Isass.exe; in the second example activity graph 610, process Firefox.exe executing event Syscall 11 spawns process explorer.exe. This is an example of topology matching.

Figure 7:
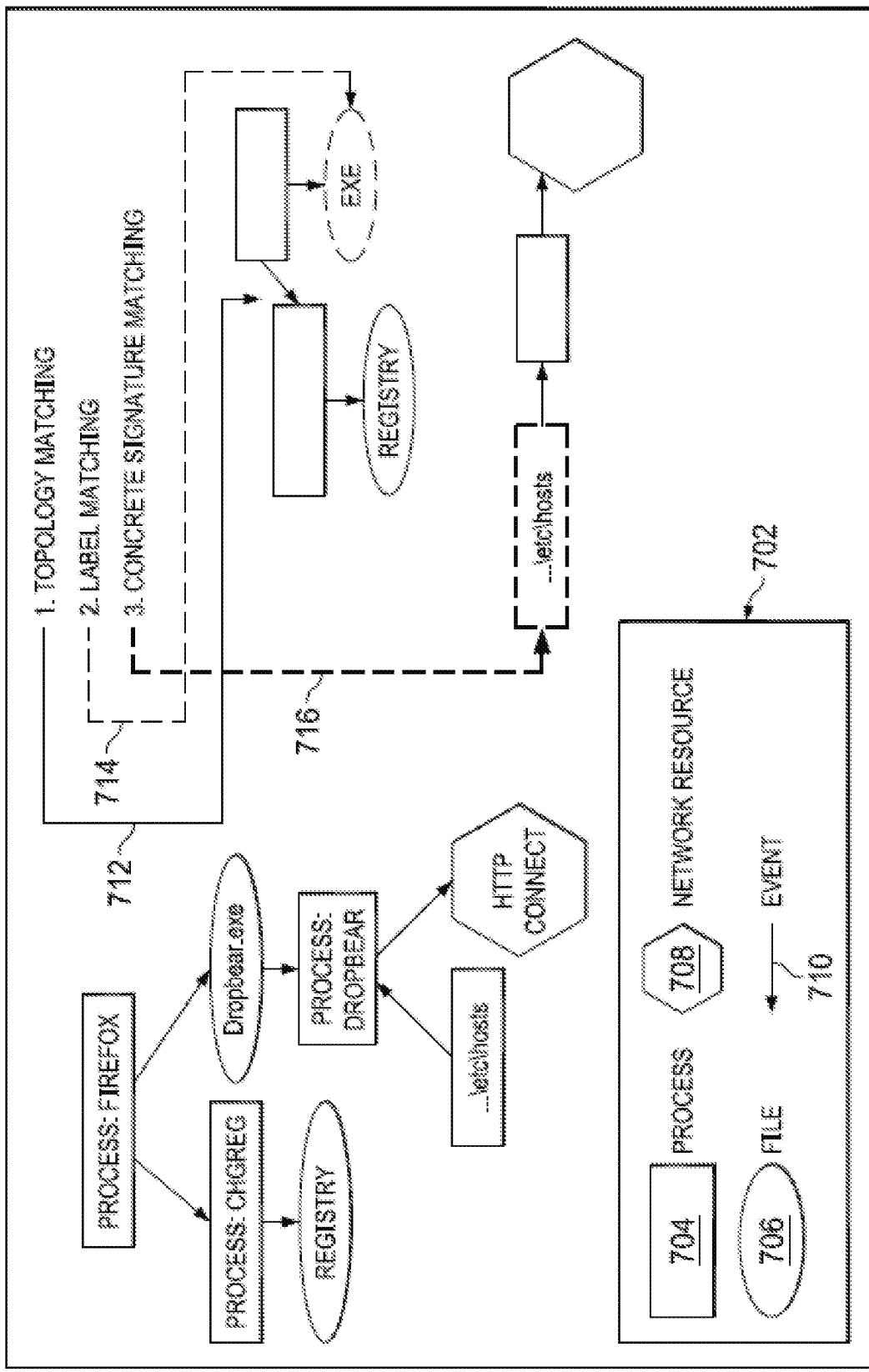
FIG. 7 depicts a representative inter-process graph constructed by monitoring activities among entities in an endpoint, and how various matching techniques are executed against that graph by an endpoint protection system according to one or more of the illustrative embodiments.

FIG. 7 depicts a more complex example wherein as a result of inter-process activity monitoring, the graph 700 is generated. As depicted in the legend 702, typically a graph comprises a set of entities, namely a process 704, a file 706, a network resource 708, and an event 710. Preferably, each entity in the endpoint system is associated with a label (or "tag") that describes its category and properties, e.g., the installed Firefox (a process entity) is a "browser," the installed Firefox is "64-bit," and so forth. Labels may be assigned manually, e.g., "browser," generated automatically, e.g., if it is a 64-bit executable, or computed via a function, e.g., the label "trusted" is assigned if the process meets certain requirements. Labels may replace entity names to create behavior patterns for a category of processes. The graph 700 in FIG. 7 depicts and comprises a set of entities, each of which may have an associated label (tag) that is defined in an off-line manner. Inter-process activity is monitored on the endpoint, with activities among entities being recorded, e.g., via system call monitoring, kernel hooking, system monitoring services, and so forth. In some illustrative embodiments, a relatively constrained set of system calls or events need to be monitored to obtain the information needed to construct a graph. One example (given Linux as the operating system) would be system calls that associate one entity with another, e.g., sys_open and stub_execve. A graph may be constructed (and updated as necessary) by connecting entities and monitored activities, with an example being graph 700. In some illustrative embodiments, the graph is stored on disk and cached in memory.

Generalizing, the activity graph represents real-time inter-process activity extraction that occurs at the endpoint. As also depicted in FIG. 7, this extraction then facilitates behavior matching (which may occur in the detection server executing in the intelligence center) using one or more matching techniques. These matching techniques may include one or more matching techniques such as topology matching 712, label matching 714, and optionally concrete signature matching 716. As noted above, inter-process activities (and their associated labeling) as depicted in the graph reveal goals of one or more processes, as well as their particular execution paths. Matching the generated graph(s) with malicious inter-process behaviors (also defined in the form of graphs) enables the system to detect and address attack instances. As noted, the malicious behavior patterns are predefined with some degree of abstraction to characterize key steps in a cyberattack.

More formally, and as used herein, an abstract pattern graph (such as graph 600 in FIG. 6) against which monitored inter-process activity is compared is sometimes referred to herein as a pattern graph (PG). A PG may include one or more constraints, wherein a constraint may be, for example, a Boolean function on elements or relations of elements of the graph. In some illustrative embodiments, there are two types of constraints, namely, single element constraints (e.g., properties/classes/concepts of a vertex/edge in a pattern graph (PG)), and one or more element relation constraints (i.e. how one element relates to another, e.g., direct connection, later than, connect with "n" steps, and so forth). The monitored activities of a host (endpoint) are instantiated in a graph that is sometimes referred to herein as an activity graph (AG) or computation graph (CG). In FIG. 6, graphs 608 and 610 represent an AG or CG. As will be described, a goal of pattern matching then is to search for all subgraphs of AG that satisfy PG. As is further described herein, it is assumed that querying a database to verify a single element constraint or one element relation constraints are practical; a remaining task then is to provide for multi-constraint graph solutions, namely, how to orchestrate database query generation to satisfy all constraints efficiently. A technique associated with the illustrative embodiments addresses this problem, as described herein.

Figure 8:
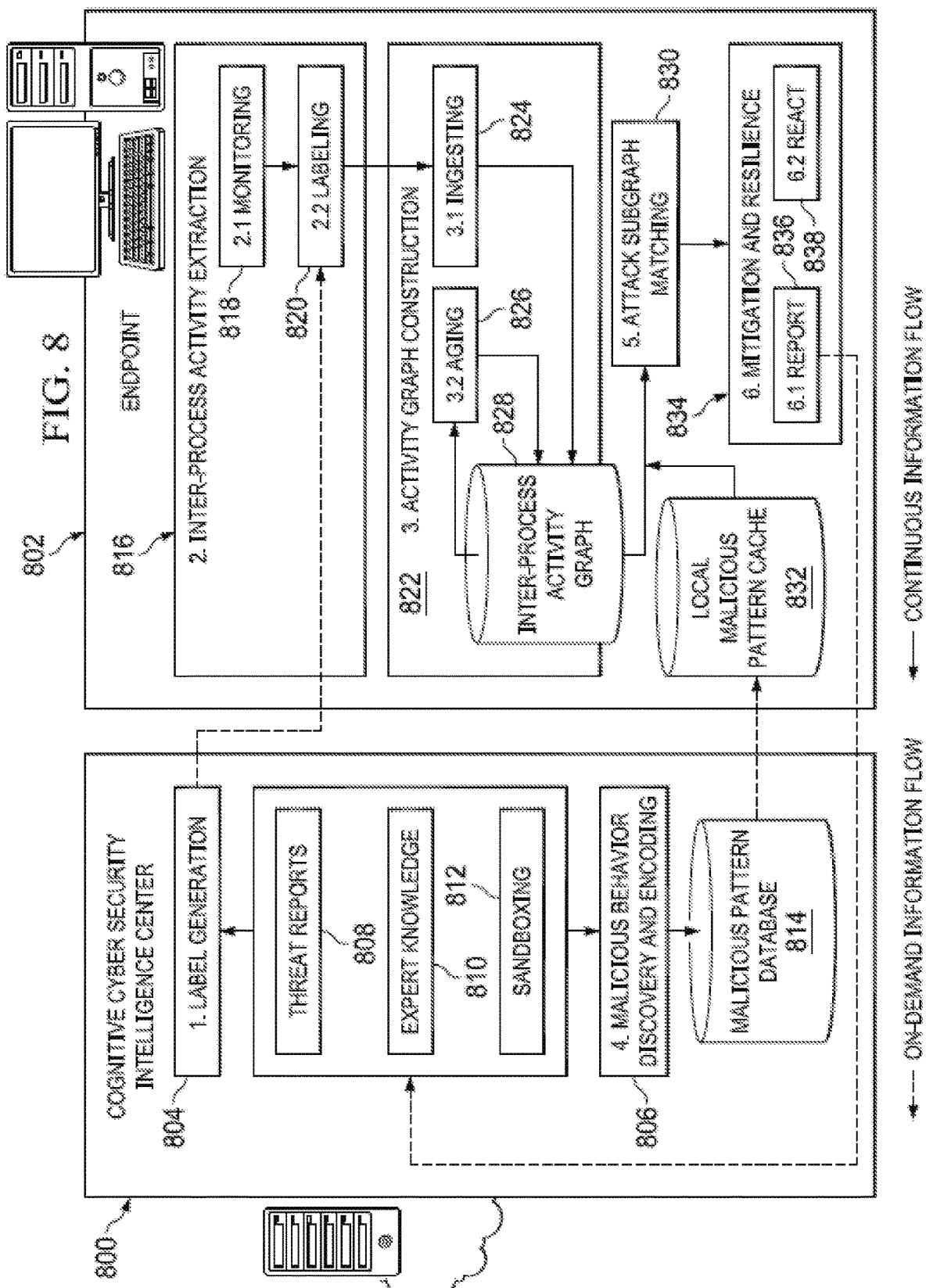
FIG. 8 depicts an implementation of an endpoint inter-process activity extraction and pattern matching system in accordance with one illustrative embodiment.

FIG. 8 depicts a representative embodiment of a detection system in which the endpoint inter-process activity extraction and pattern matching technique of one illustrative embodiment is practiced. As depicted, certain functionality is located in the intelligence center 800 (e.g., the security management platform, an APT solution, an endpoint management solution, etc.), while certain functionality is located in the endpoint 802. This arrangement of functionality is illustrated for one illustrative embodiment, but it is not intended to be limiting on the possible implementations of embodiments of the present invention. As noted above, the intelligence center 800 may be dedicated to the network of endpoints (e.g., located within an enterprise), or it may operate as a service provider (or, more generally, a "service") on behalf of multiple enterprises, each having their own set of endpoints. In one illustrative implementation, the cybersecurity intelligence center 800 is network-accessible and is deployed in a cloud-based operating environment, although this is not a limitation. Further, typically each function block identified in FIG. 8 is executed in software, i.e., as a set of computer program instructions executed in a processor. It should be appreciated that the functions identified in FIG. 8 are provided for purposes of explanation only, and that certain of these functions may be combined or otherwise re-configured as necessary.

As depicted, the intelligence center 800 performs several functions, namely, label generation 804 (step 1), and malicious behavior discovery and encoding 806 (step (4)). As depicted, typically these activities are informed by and based on existing attack information available in the intelligence center 800, e.g., threat reports 808, expert knowledge 810 and information derived from sandboxing and evaluating threats 812. This set of information is available to, or otherwise obtained by, security analysts. As described above with respect to FIG. 7, in label generation 804, each entity in the endpoint system 802 is associated with one or more labels that describe its category and properties. The labels are applied manually, automatically, programmatically, etc., or by some combination. The label generation 804 may be carried out periodically, or upon a given occurrence. The malicious behavior discovery and encoding 806 derives malicious (or otherwise suspect) graph patterns from existing attacks. As noted, in some illustrative embodiments these patterns are determined by human analysts, other security detection mechanisms, machine learning systems, or combinations thereof. As also depicted, a set of malicious patterns generated from the knowledgebase of attack source (808, 810, 812) is stored in a malicious pattern database 814.

Turning to the endpoint functions 802, function block 816 (step 2) represents inter-process activity extraction, which involves monitoring 818 (step 2.1), and labeling 820 (step 2.2). The monitoring function 818 records activities among entities, e.g., via system call monitoring, kernel hooking, system monitoring services and the like. Thus, the monitoring function 818 may leverage existing endpoint service functionality. As noted, it is not required that the monitoring 818 monitor all system calls or events, and the calls and events to be monitored are configurable as needed. In step 2.2, the labeling function 820, takes a behavior signature created by the labeling function (step 1) and builds an abstract/labelled behavior signature. This abstraction is desirable, as the abstract/labelled behavior signature expresses attack logic in a more general manner and thus covers one or more attack variants for a specific attack, and it enables the efficient matching of labels or concrete vertices/edges during subsequent matching operations (described below).

Function block 822 (step 3) provides activity graph construction. As will be described, this processing typically involves ingesting 824 (step 3.1), which extends the graph as new activities occur and are monitored, and aging 826 (step 3.2), whereby vertices/edges of the graph are dropped (pruned) if they are older than a configurable threshold, or if their distance(s) to a newly-extended graph are larger than a configurable threshold. The inter-process activity graph generated by these activity graph construction functions 822 is stored in a database 828. The inter-process activity graph evolves as the monitoring, ingesting and aging functions operate, preferably on a continuous basis.

As also depicted, the endpoint supports an attack subgraph matching function 830 (step 5). Using this function, the endpoint protection system continuously performs graph pattern matching between the evolving inter-process activity graph, and the malicious behavior graph patterns. These patterns are provided by the malicious pattern database 814 in the intelligence center 800 and stored in a local malicious pattern cache 832. As described above, the attack subgraph matching function searches for graph substructure that matches the malicious behavior graph pattern(s) stored in the local cache 832. Thus, in this approach, the endpoint detection system functionality compares the evolving activity graph with the malicious inter-process graph patterns. Based on this matching, a mitigation and resilience function 834 (step 6) may then be called. Function 834 comprises a report function 836 (step 6.1), and a react function 838 (step 6.2). The function 834 thus provides for post-detection operations, which comprises halting the involved processes, alerting, moving the involved processes to a sandbox for further evaluation, dropping on-going network sessions, halting on-going disk operations, handing off the matched subgraph to a user to decide a next step, submitting the matched subgraph to a security analyst for further study, training a machine learning classifier, and so forth. These are merely representative post-detection operations.

As depicted in FIG. 8, the mitigation and resilience function 834 interacts with the intelligence center 800 in an on-demand manner, whereas information flow within the endpoint functions is continuous. Although this is the preferred approach, it is not intended to be limiting, as one or more functions in the endpoint 802 may be carried out periodically, in response to an occurrence, or on-demand.

Thus, the techniques of one or more illustrative embodiments provide for a robust method to monitor and protect an endpoint by recording inter-process events, creating an inter-process activity graph based on the recorded inter-process events, matching the inter-process activity (as represented in the activity graph) against known malicious or suspicious behavior (as embodied in a set of pattern graphs), and performing a post-detection operation in response to a match between an inter-process activity and a known malicious or suspicious behavior pattern. Preferably, matching involves matching a subgraph in the activity graph (AG) with a known malicious or suspicious behavior pattern as represented in the pattern graph (PG). During this processing, preferably both direct and indirect inter-process activities at the endpoint (or across a set of endpoints) are compared to the known behavior patterns. The following provides additional details regarding various operations (functions) of the detection system described above.

Figure 9:
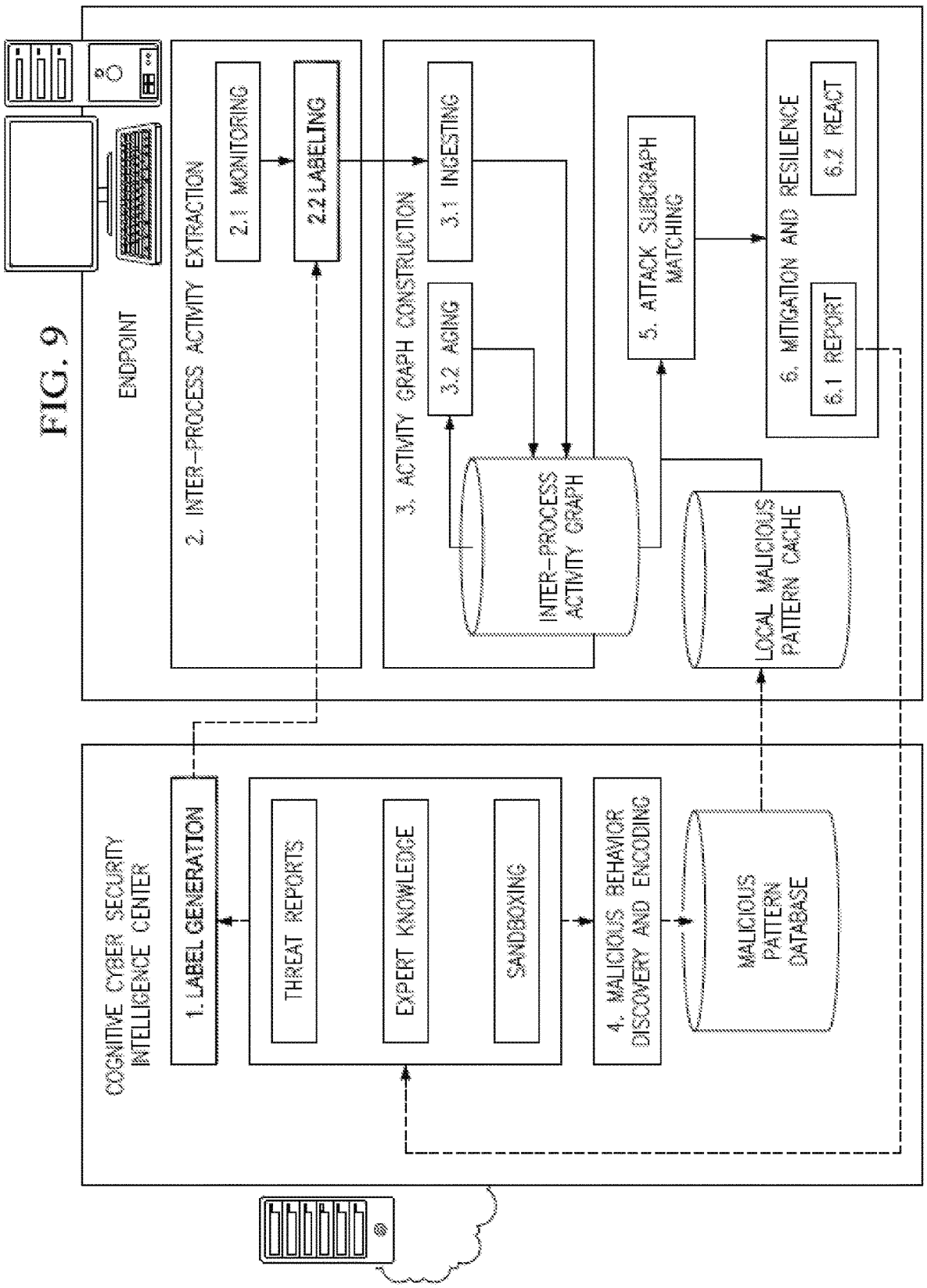
FIG. 9 depicts how labelled subgraph matching is implemented in one illustrative embodiment.

FIG. 9 depicts how labelled subgraph matching is implemented in accordance with on illustrative embodiment. As described above, and as depicted, the label generation (step 1) typically occurs in the intelligence center, and a labelling function (step 2.2) is carried out in the endpoint. In this approach, preferably a concrete signature (e.g., which is available to the system, e.g., by virtue of prior attack data, or otherwise) is converted to a behavior signature (concrete) (in step 1), which is then converted to an abstract/labelled behavior signature (in step 2.2). This technique facilitates labelled subgraph matching, because an abstract/labelled behavior signature expresses general attack logic (as opposed to just some specific attack flow). In particular, an abstract/labelled behavior signature is matched (e.g., by its labels or by concrete vertices/edges) during the attack subgraph matching. By expressing the attack logic, the graph-based behavior signature covers more attack variants than ad hoc approaches that use simple concrete inter-process behavior signatures.

Figure 10:
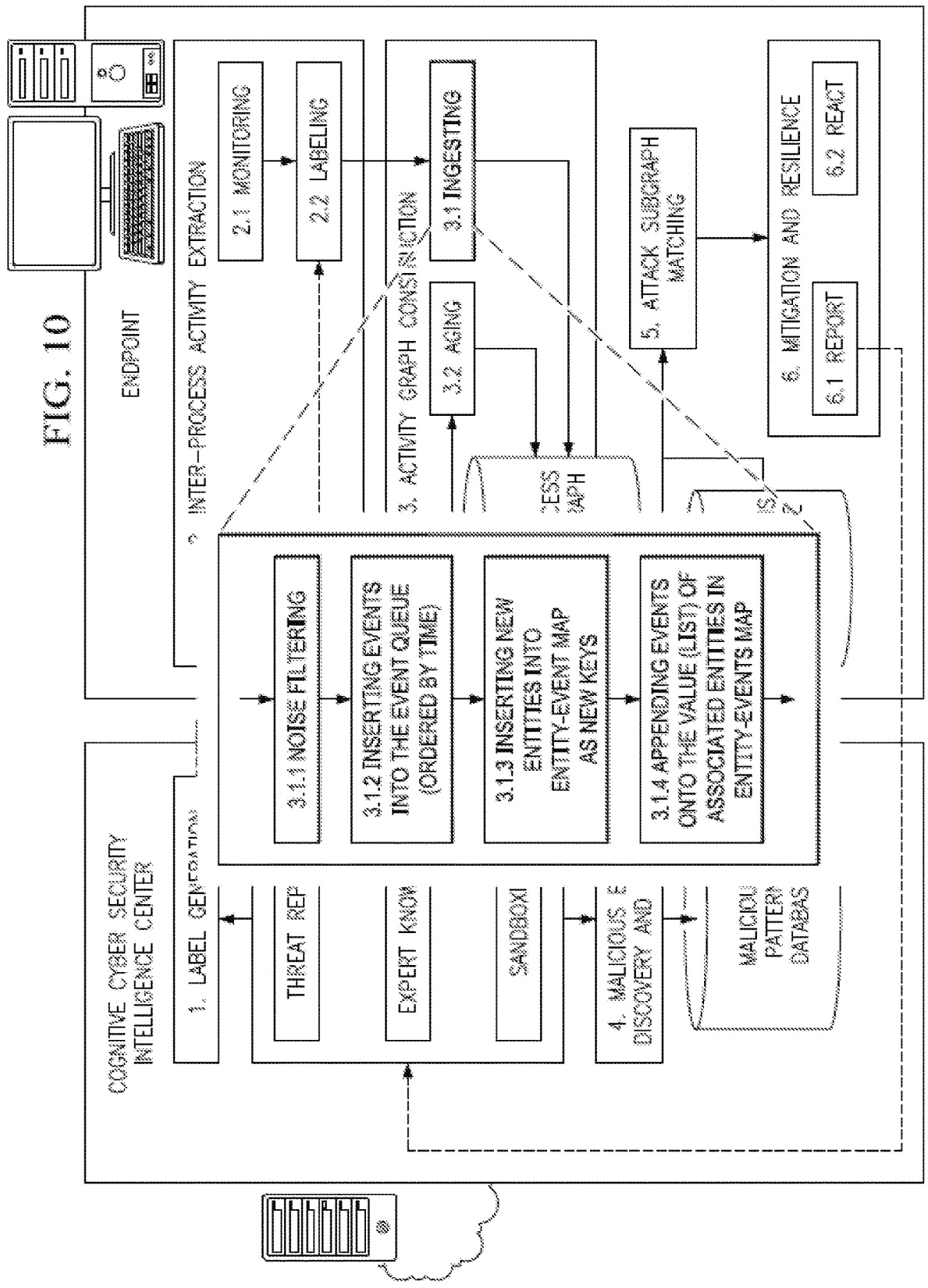
FIG. 10 depicts the ingesting function in additional detail in accordance with one illustrative embodiment.

FIG. 10 depicts the ingesting function (step 3.1) in additional detail. As depicted, the ingest function begins by filtering noise (step 3.1.1), after which events are inserted into an event queue, ordered by time (step 3.1.2). Then, to facilitate evolving the inter-activity graph, new entities are inserted into an entity-event map, preferably as new keys (step 3.1.3). As additional events are received, these events are then appended onto the value (list) of associated entities in the entity-event map (step 3.1.4).

Figure 11:
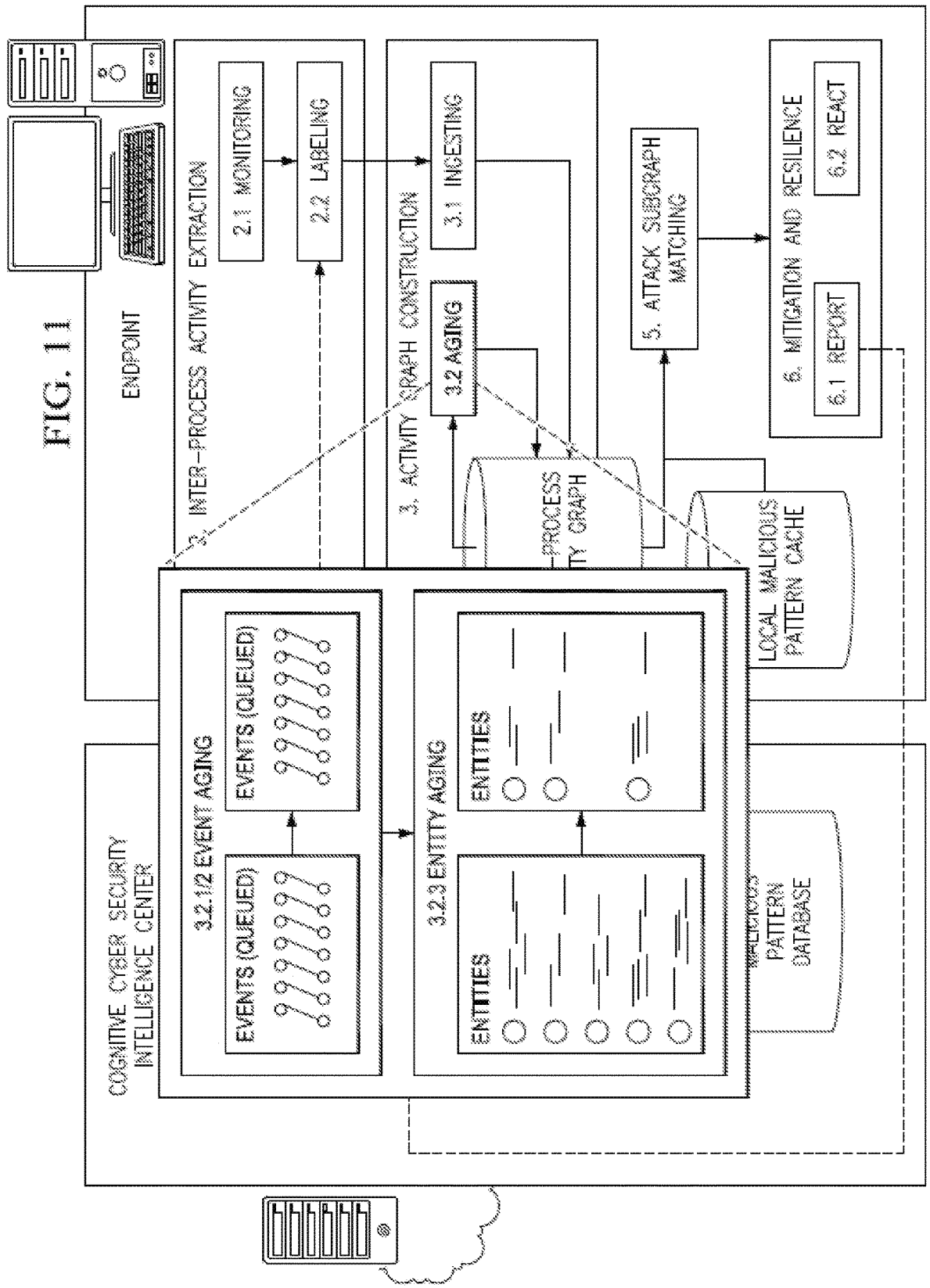
FIG. 11 depicts how the aging function is used to evolve an activity graph in accordance with one illustrative embodiment.
Figure 12:
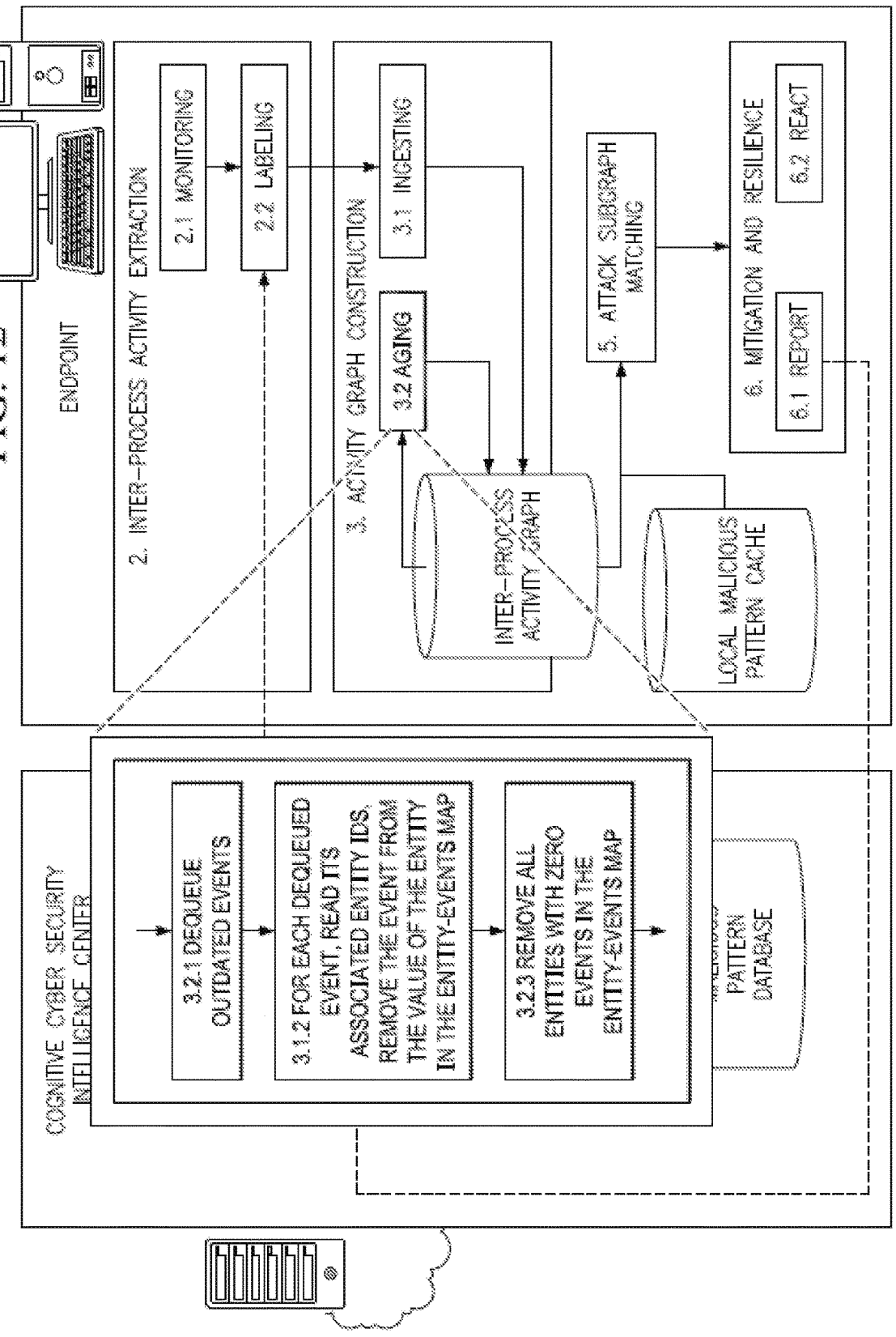
FIG. 12 depicts the aging function in additional detail in accordance with one illustrative embodiment.

FIG. 11 and FIG. 12 depict and describe how the aging function is used to evolve an activity graph. FIG. 11 shows an entity-event map at two (2) distinct times (initially, and then following application of the aging function). As depicted, as events are discovered (received), they are queued to an event queue and represented in the entity. The resulting entity-event map is shown on the left side of the drawing. As given events age, they are pruned (de-queued) from the event queue, and the affected entity likewise is updated. This updated entity-event map is represented on the right side of the drawing. FIG. 12 depicts these operations in a process flow. Thus, in step 3.2.1 outdated events are dequeued. At step 3.1.2, and for each dequeued event, its associated entity identifier (id) is read, and the event is removed from the value of that entity in the entity-events map. At step 3.2.3, all entities with zero events are removed in the entity-events map.

Figure 13:
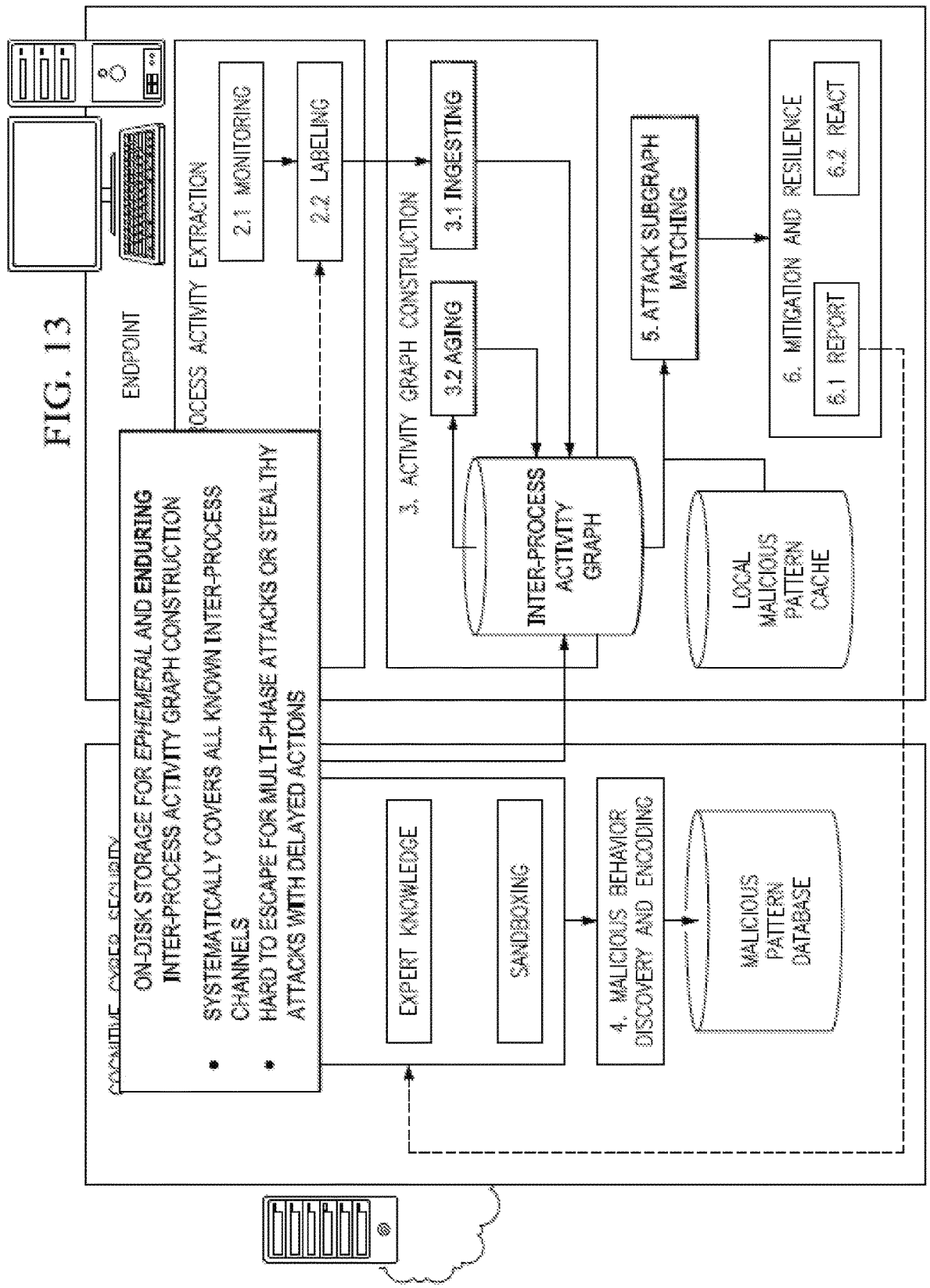
FIG. 13 depicts how the detection system provides indirect inter-process activity modeling using on-disk storage for ephemeral and enduring inter-process activities in accordance with one illustrative embodiment.

FIG. 13 depicts how the detection system provides indirect inter-process activity modeling, preferably using on-disk storage for ephemeral and enduring inter-process activities. As shown, the ingesting function (step 3.1) and the aging function (step 3.2) facilitate the building of the inter-process activity graph to facilitate the attack subgraph modeling (step 5). During these operations, on-disk storage for both ephemeral and enduring inter-process activity graph construction ensures that all known inter-process channels are systematically covered. The approach further ensures that multi-phase attacks, or stealthy attacks with delayed actions, do not escape discovery.

Figure 14:
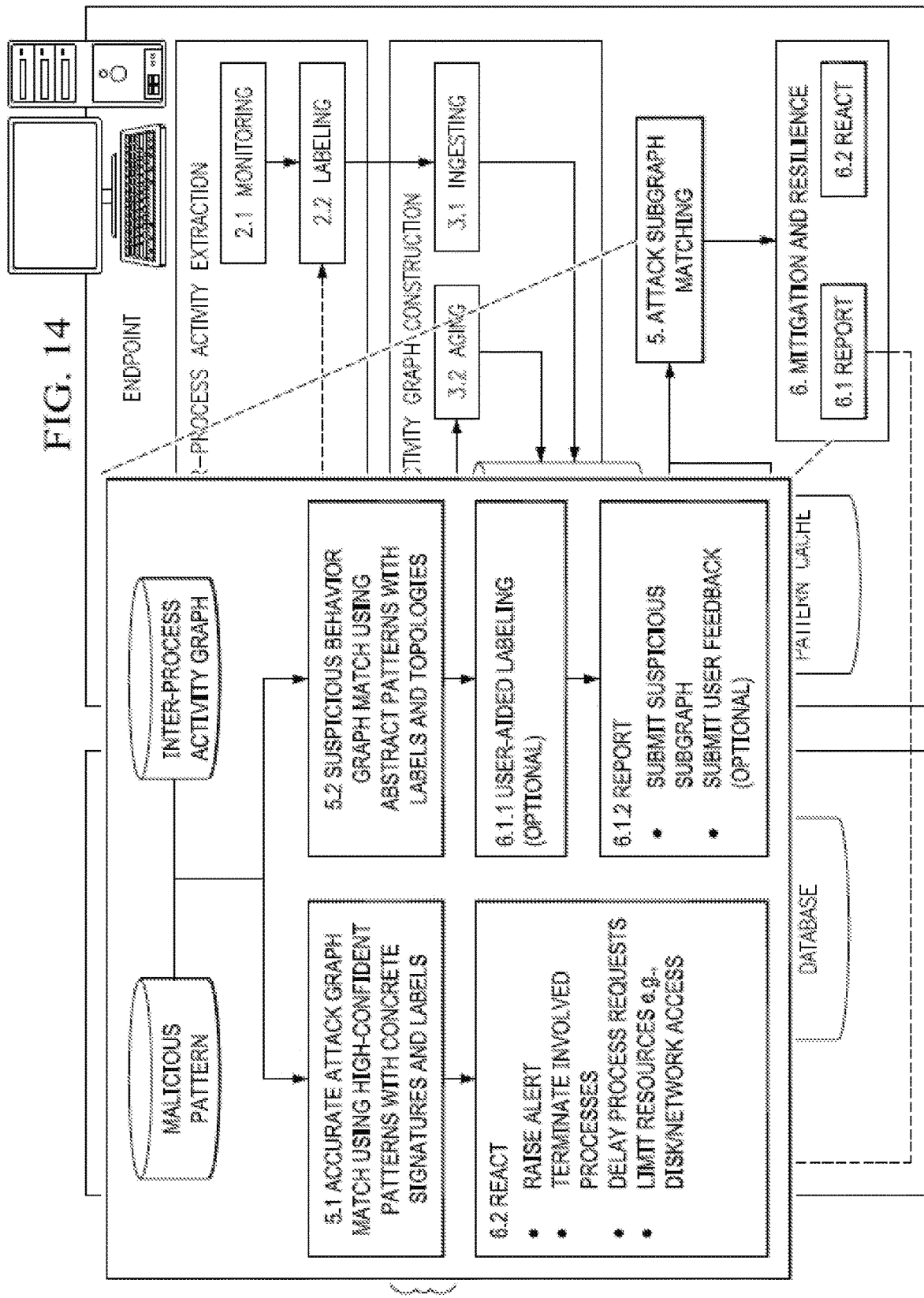
FIG. 14 depicts additional details regarding the matching function, and the mitigation and resilience function in accordance with one illustrative embodiment.

FIG. 14 depicts additional details regarding the matching function (step 5 in FIG. 8), and the mitigation and resilience function (step 6 in FIG. 8). Step 5.1 represents a malicious behavior match with high confidence, typically based on concrete signatures and labels. When a malicious behavior match of this type occurs, typically one or more of the operations identified in the react function (step 6.2) are carried out. Step 5.2 represents a suspicious behavior match, typically based on using abstract patterns with labels and topologies. When a suspicious behavior match of this type occurs, user-aided labelling (step 6.1.1) may be done, followed by one or more reporting operations (step 6.1.2). The user-aided labelling operation is optional.

There is no requirement that any specific algorithm be implemented for behavior discovery, or for behavior signature matching. Rather, the system approach as described above provides a systematic approach to detect complex and/or long-lasting cyberattacks that arise based on direct and indirect inter-process activities.

A pattern graph (PG) (such as graph 600 in FIG. 6) may be specified visually (i.e., by drawing a graph), although this is not a requirement. A pattern graph (or graph pattern) also may be specified in other ways, e.g., by a program language.

The following provides additional details regarding the activity graph (AG) construct as described above. The activity graph typically expresses computations on one or more computing devices (which may include the endpoint) as a temporal graph. As such, the activity graph is also sometimes referred to herein as a computation graph (CG), as it represents an abstraction of the computations. The notion of an "activity graph" and a "computation graph" are used herein synonymously. As previously described, the basic elements of a AG/CG are entities (e.g., processes, files, network sockets, registry keys, GPS sensor, accelerometer, etc.), and events (e.g., file read, process fork, etc.). An entity is any system element that can either send or receive information. An event is any information/control flow that connects two or more entities. Events are information flows between entities in a pair of entities at specific times. Events can be captured in the form of system calls, etc. An event has a unique timestamp (when it happens), and an information flow direction (directional, bi-directional, non-directional). An indegree entity of an event can be one or two entities of the event based on its direction. An outdegree entity of an event can be one or two entities of the event based on its direction. A timestamp is an integer or real number that records the time of an event, and a join point (or checkpoint) is a tuple of <entity, timestamp>.

Thus, an AG/CG references a history of computation including any entities or events associated with attacks or threats. Security-related data, such as alerts, indicators of compromise (IOCs), and intermediate threat analysis results are subgraphs, which can be denoted as labels on elements of a AG/CG, where an element is an alias referencing an entity or an event. As a result, threat detection is a graph computation problem whose solution is to iteratively deduce threat-inducing subgraphs in a AG/CG.

More generally, and as used herein, an activity graph is a labeled semi-directed temporal graph that objectively records both intrusive and non-intrusive computations on computing devices, together with any security knowledge associated with the computations. A particular label on the graph typically denotes one of several categories, e.g., the labels: element attribute, element relation, and security knowledge. An element attribute label is objective information derived from computation recording (as has been described above). The element attribute label is a type of label that identifies a set of elements with a particular attribute, e.g., an event type READ. An element relation label is objective information derived from computation recording. The element relation label is a type of label that expresses some relation among a set of elements, e.g., a provenance linkage between READ and WRITE events of a process, which connects a large number of READ/WRITE events. The element relation label embeds finer-grained provenance information into an inter-process level pattern graph (PG). A security knowledge label (when used) is subjective information regarding the security and privacy goals and reasoning procedures. The security knowledge label is a type of label that marks a group of elements with some security knowledge. A security knowledge label can be generated, for example, as either intermediate/final results of threat deduction, organization policies, IOCs, or anomaly scores imported from external detection systems, e.g., a set of confidential files, or IP addresses marked as command and control servers.

Enterprises and organizations may inspect computations at multiple levels for threat discovery. An AG/CG describes computations at a selected monitoring level, such as network, host or process level. Given a monitoring level, e.g., network, the activities within an entity, e.g., process communications within a host, are usually out of the monitoring scope and not expressed in the CG. Finer-grained computation information may be either expressed in a lower-level CG, e.g., a CG at the host level, or embedded into the CG as labels, e.g., provenance labels.

Figure 15:
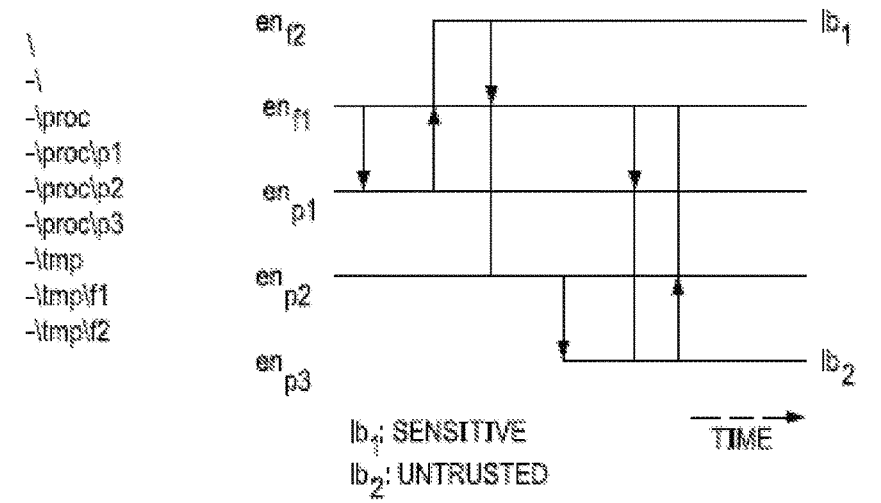
FIG. 15 depicts a representative activity graph for host level activities in accordance with one illustrative embodiment.

FIG. 15 depicts a representative host-level AG/CG, e.g., processes and files. FIG. 15 (and FIGS. 16-17 that follow) represents computation history as a temporal grid, wherein a horizontal line represents an entity, and wherein a vertical line represents an event. In FIG. 15, system activities are logged, e.g., via syscall monitoring and program instrumentation. Entities (en) in this CG consist of subjects (e.g., processes and threads) and objects (e.g., files, pipes, and network sockets). In this example, security data is embedded in labels: lb1: sensitive indicates that enf2 contains sensitive information, and lb2: untrusted indicates that enp3 is not certified by the company. In this example, data leakage occurs when enp3 can be traversed from enf2, as shown in FIG. 15.

Figure 16:
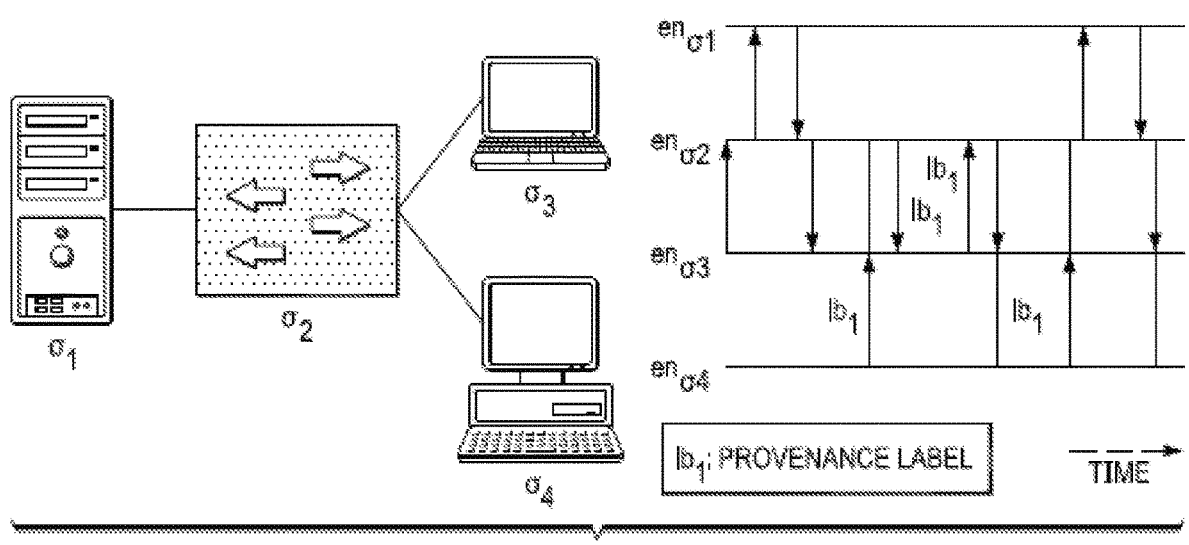
FIG. 16 depicts a representative activity graph for network-level activities in accordance with one illustrative embodiment.

FIG. 16 depicts a representative AG/CG at network level. In this example, the metadata of link layer communications of a small network is logged for threat intelligence computing. As depicted, lb1 is a provenance label linking four events among entities enσ2, enσ3 and enσ4. The link lb1 helps identify the causal chain between enσ3 and enσ4 avoiding impossible paths. Attack steps such as port scans and cross-host lateral movements can be identified and reasoned on this computation graph.

FIG. 17 depicts an AG/CG at the process level, wherein activities with a process are monitored, e.g., via dynamic program analysis. In this graph, entities are memory addresses of code and data; events are instructions (e.g., call) or syscalls (nmap). The infinity of $\Theta$ (the space of entities that can be monitored or traced) supports the representation of recursive calls, e.g., instances of foo( ) are described as enfoo, en'foo, . . . . Software exploit activities such as return-to-libc and return-oriented programming (ROP) can be captured and inspected on this computation graph.

Given an activity/computation graph that records objective computation histories regarding both intrusive and non-intrusive data, threat recovery reduces to a graph query problem of iteratively computing the closure over the subset of security related subgraphs in the AG/CG, and finally yielding a subgraph that describes the threat or intrusion. Graph queries can be programmed into intrusion detection systems or behavior anomaly detection systems, or they can be accomplished through on-demand agile reasoning development. Threat hunting composes sequences of graph queries to iteratively and interactively conceive, verify, revise and confirm threat hypotheses.

The process of composing and executing graph queries in the activity/computation graph is graph computation. During the computation, any variable referencing a subgraph is also a label to the set of entities and events of that subgraph, and the variable can be stored as a label on the AG/CG. Because the outcome of each iterative graph computation step is a subgraph or a label, each step can be implemented natively in a graph computation language or in an external module as a black-box, which outputs a set of events and entities as the subgraph. Threat intelligence therefore is generated in the graph query when a threat is discovered. The query, especially the pattern graph (PG), describes the threat and can be executed to search other activity/computation graphs for the specific threat.

Graph pattern matching is at the core of graph querying. In general, a graph pattern, in essence, is a set of constraints describing the subgraph(s) to be matched, where a constraint over graph elements describes (1) a single graph element (e.g., a label/property of an entity), or (2) an element relation (e.g., an entity connects to an event). Pattern composition allows for embedding human domain knowledge into the deduction procedure. Simple pattern examples, which can be expressed by most graph languages, include: behavior of typical DLL injections (e.g., two entities with PROCESS labels are connected by an event with label CREATE_THREAD), behavior of untrusted executions (e.g., an entity with FILE label but not a TRUSTED_EXE label connects to an event labeled EXECUTE, then to an entity labeled PROCESS), and behavior of data leak (e.g., an entity labeled with SENSITIVE connects to an entity labeled NETFLOW within a given number of hops). These are representative but non-limiting examples.

To manage activity/computation graphs and the pattern graph computations atop them the above-described system comprises a graph database designed and implemented to provide efficient data storage and retrieval for live and forensic threat investigations. In some illustrative embodiments, the graph database is backed with a distributed key-value store for low-level PG operation optimization targeting unique computation graph properties, such as data locality and immutability. A representative database of this type is described in "FCCE: Highly scalable distributed Feature Collection and Correlation Engine for low latency big data analytics," to Schales, et al. (hereinafter "FCCE"). In general, a suitable database is one that employs a distributed key-value store for long-term monitoring data storage with data locality optimization, together with concurrent multi-source streaming data ingestion.

The technique described above provides significant advantages. As explained, the approach enables systematic inter-process activity extraction and behavior matching. The technique addresses the deficiencies in prior schemes that rely on signature matching, single (intra-) process detection schemes, and ad-hoc inter-process behavior modeling. As noted, the approach herein also enables modeling of both direct and indirect inter-process activities, as well as efficient matching of concrete activities with abstract patterns indicative of malicious or suspicious behaviors. The result is more robust and accurate protection of the endpoint against attack. Further, the technique enables more effective post-detection operations that can be carefully tuned to the detected activity.

Using inter-process behavior patterns as abstract attack signatures as described provides significant benefits as compared to existing concrete attack signature schemes. Inter-process activities monitored in accordance with the techniques herein record attacks with long attack vectors, or attacks that use multiple processes to fulfill attack goals. Prior signature-based approaches do not discover such attacks. Using the abstract/labelled behavior signature (as opposed to a more concrete signature) to express the attack logic, more attack variants can be covered during the detection process. Indeed, prior art techniques, which often operate on fine-grained attack descriptions, require significantly more computational power to model and reason, thereby making these techniques impractical or costly. In addition, attack descriptions that are less fine-grained than the abstract/labelled behavior signature herein, often cannot help to detect intrusions in the endpoint itself. Further, inter-process behavior according to the illustrative embodiments has clear semantic meaning for end users to comprehend, and to take actions if needed.

In general, the above-described approach provides for an improved endpoint detection-based cybersecurity. The subject matter further provides for a new approach to systematically model inter-process behaviors for use in characterizing malicious or suspect behavior patterns between or among processes. This modeling provides the foundation for advanced detection and, in particular, an inter-process malicious/suspicious behavior discovery and inter-process behavior signature matching.

The approach described provides for enhanced processing with respect to security event data (e.g., a cybersecurity incident), and enables the system to respond more efficiently to the incident. The approach, being automated, is highly efficient, and greatly eases the workflow requirements for the SOC analyst to facilitate post-detection operations, such as threat hunting.

Iterative Constraint Solving in Graph Matching for Cyber Incident Reasoning

As noted, the AG/CG is a graph of elements with constraints and connections among them. Pattern matching of such graphs requires satisfying all constraints of all elements, as well as how they are connected. Usually, however, one query from a graph database can only deal with one constraint or connection relation. To address this limitation, the below described aspect of the illustrative embodiments provides a novel constraint solving algorithm to compute and orchestrate queries, as well as to handle the query results, thereby ensuring correctness and efficiency of the abstract graph pattern matching.

The following describes a technique for constraint solving that is utilized for pattern matching, e.g., matching an activity graph (e.g., one built by an endpoint) against a graph pattern. This operation is used, for example, in an attack subgraph matching function (e.g., element 830, step (5) in FIG. 8). As noted above, pattern matching evaluation involves solving the set of constraints, or predicate expressions, defined by the pattern. This task is computationally non-trivial because a pattern can refer to other patterns via parameters, and because the pattern graph typically is stored on distributed external storage, making it expensive to check data associated with each predicate.

To cope with the parametric expressiveness of patterns, the following technique is implemented. In particular, the constraint solving process efficiently decides when and how many times pattern application needs to be performed for a single pattern reference. For example, if a pattern reference associates with a variable that relates to a particular predicate (e.g., reach), the referred pattern may be applied repeatedly in the traversal procedure to minimize on-disk data requests in subsequent traversal steps.

Because on-disk data queries only support solving one constraint at a time, the constraint solving process (or algorithm) of the illustrative embodiments works by solving constraints iteratively and propagating a latest-solved constraint to all variables associated with previously-satisfied constraints. In particular, when a pattern graph (PG), e.g., defining an attack/threat, is parsed and an abstract syntax tree (AST) is created, an interpreter determines how constraints are connected and stores the constraint relations as a graph of constraints (GoC) into a supplementary data structure in the AST. To evaluate a pattern, a constraint solver orders constraints (e.g., by heuristics, user guidance, or the like) and iteratively satisfies all constraints, including single-element constraints (e.g., x has <type: READ>) and multi-element constraints (e.g. x conn y). After each iterative constraint-solving step, variables associated with the pattern may undergo a state change. According to one illustrative embodiment, this state change is propagated to all previously-stored variables (as used herein, a variable refers to a set of matched results of an element in abstract pattern graph) through a graph traversal on GoC, from the changed variables to all previously-solved variables.

Thus, the graph of constraints (GoC) is derived from the PG as a complementary data structure for use by the constraint solving algorithm. Once a constraint in PG is satisfied, the algorithm checks whether all previously satisfied constraints still hold. This operation is designed to remove some subgraph instances in the AG/CG that satisfy previous constraints but not necessarily the latest one. This operation is realized as a graph traversal from a latest constraint node in the GoC to all other existing nodes (previously-solved constraints).

Thus, according to this aspect of the illustrative embodiments, an abstract graph pattern matching system serializes simple database queries for single graph element constraint solving and then performs iterative constraint propagation to ensure the correctness of the matching for the entire abstract graph pattern. The basic notion is to evaluate a single element constraint at a time, and then propagate the constraint solving results to all related pattern elements, e.g., by traveling the pattern (as a connected graph, namely the GoC). As will be described, in some illustrative embodiments, the second half of the one element constraint solving step only evaluates connectivity constraints, but not single element constraints. The steps of single element constraint solving are repeated and single element constraints are evaluated followed by propagations. This process continues until all single element constraints have been evaluated and all propagations have been performed.

FIG. 18 depicts the iterative constraint solving process according to one illustrative embodiment as a process flow. The iterative constraint solving process (sometimes referred to as an "iterative constraint solver") provides significant computational- and storage-efficiencies by solving constraints iteratively and propagating a latest-solved constraint to all variables associated with previously-satisfied constraints. Referring to FIG. 18, the process begins at step 1800 by building a relation graph among PG elements, this relation graph being the GoC described above. At step 1802, all elements in the GoC are marked as unsolved. At step 1804, a test is performed to determine whether all elements in the GoC are marked as solved. If not, the routine continues at step 1806 to solve a one element constraint and to then mark it as solved. As noted above, preferably the iterative constraint solver solves one constraint at a time. At step 1808, and with respect to the one element constraint, the results (of solving the one element) are propagated to all connected elements in the GoC that have been solved. The process then returns to step 1804 and iterates until all elements in the GoC are marked as solved. When the outcome of the test at step 1804 is positive (namely, that all elements in the GoC are marked as solved), the process continues at step 1810 to output the matched subgraph(s). This completes the processing.

Thus, the iterative solver of this illustrative embodiment starts with an empty set of touched variables and initializes each variable untouched (step 1802). The process then performs new constraint evaluation by evaluating a single constraint per iteration, setting its associated variables as touched (step 1806). In the same iteration, the process then propagates the constraint, in particular by updating related touched variables to reflect the change (step 1808). The process then repeats the new constraint evaluation (for other constraints not yet marked) and continues until all constraints have been evaluated.

When evaluating a single element constraint, each constraint works like a filter on the graph element. For example, "element x {type: event_read}" filters out elements in "x" that are not type event_read. When evaluating a connectivity constraint, each constraint works like a filter on two or more graph elements. For example, "element x connects toy" filters out elements stored in variable "x" that do not connect to "y," and vice versa for "y". The above-described filtering occurs in memory if the variable has been touched in previous iterations. Otherwise, the variable keeps a reference to the entire activity graph (stored in the database). A database query is then generated to filter the entire activity graph.

In one embodiment, the propagation operation (step 1808) uses a custom breath first search (BFS) function that uses a queue that takes into account the connectivity of the GoC. This function takes into consideration whether an element has been solved (as only solved elements are pushed to the queue), and whether the constraint makes any change (a vertex is dropped from the queue if no change occurs). In one illustrative embodiment, the propagation applies element relation constraints based on the newly-solved element to impact the other elements in the relation constraint.

Figure 19:
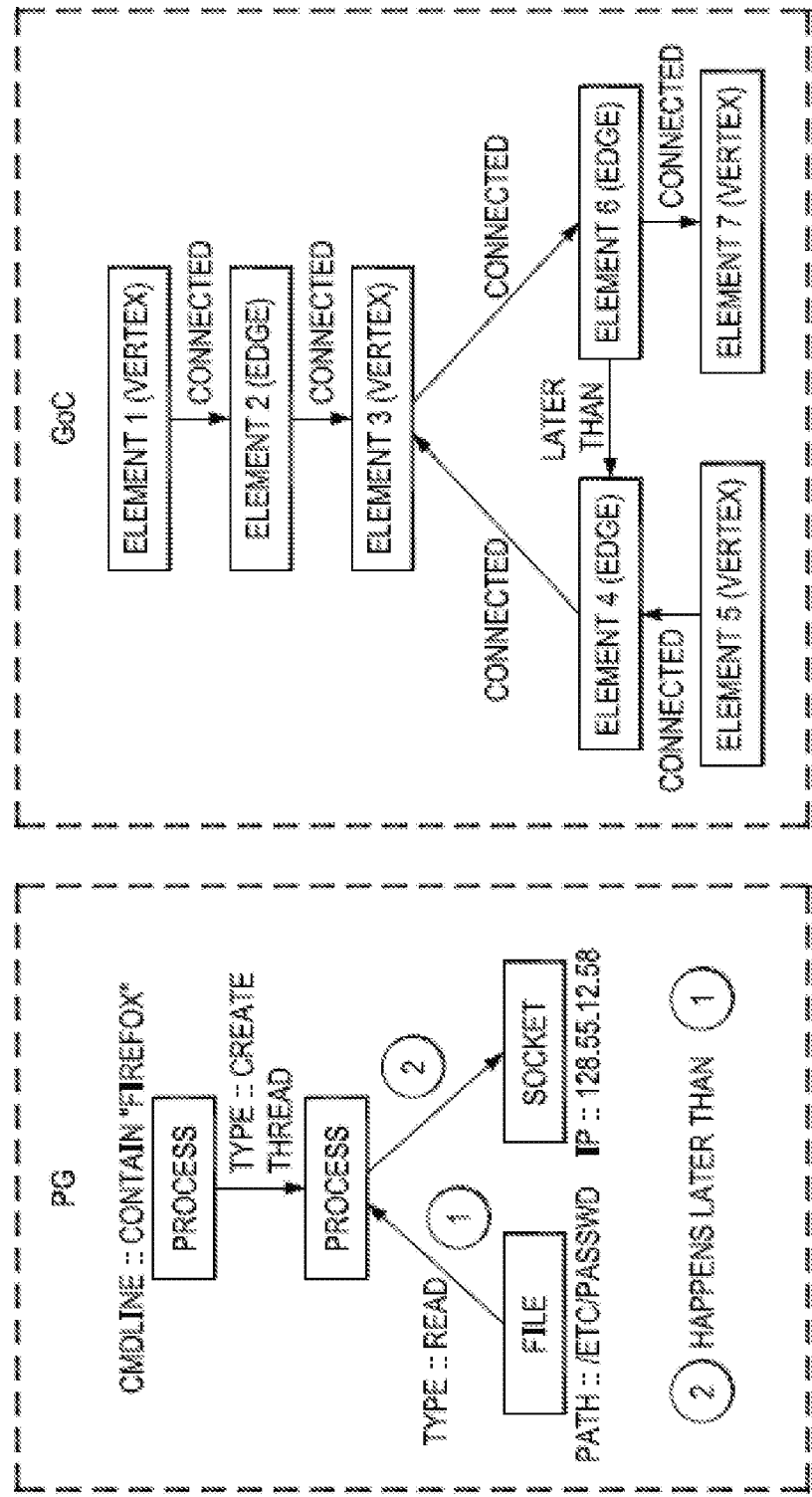
FIG. 19 depicts a representative example of a representative pattern graph, and a corresponding graph of constraints (GoC) derived therefrom in accordance with one illustrative embodiment.
Figure 20:
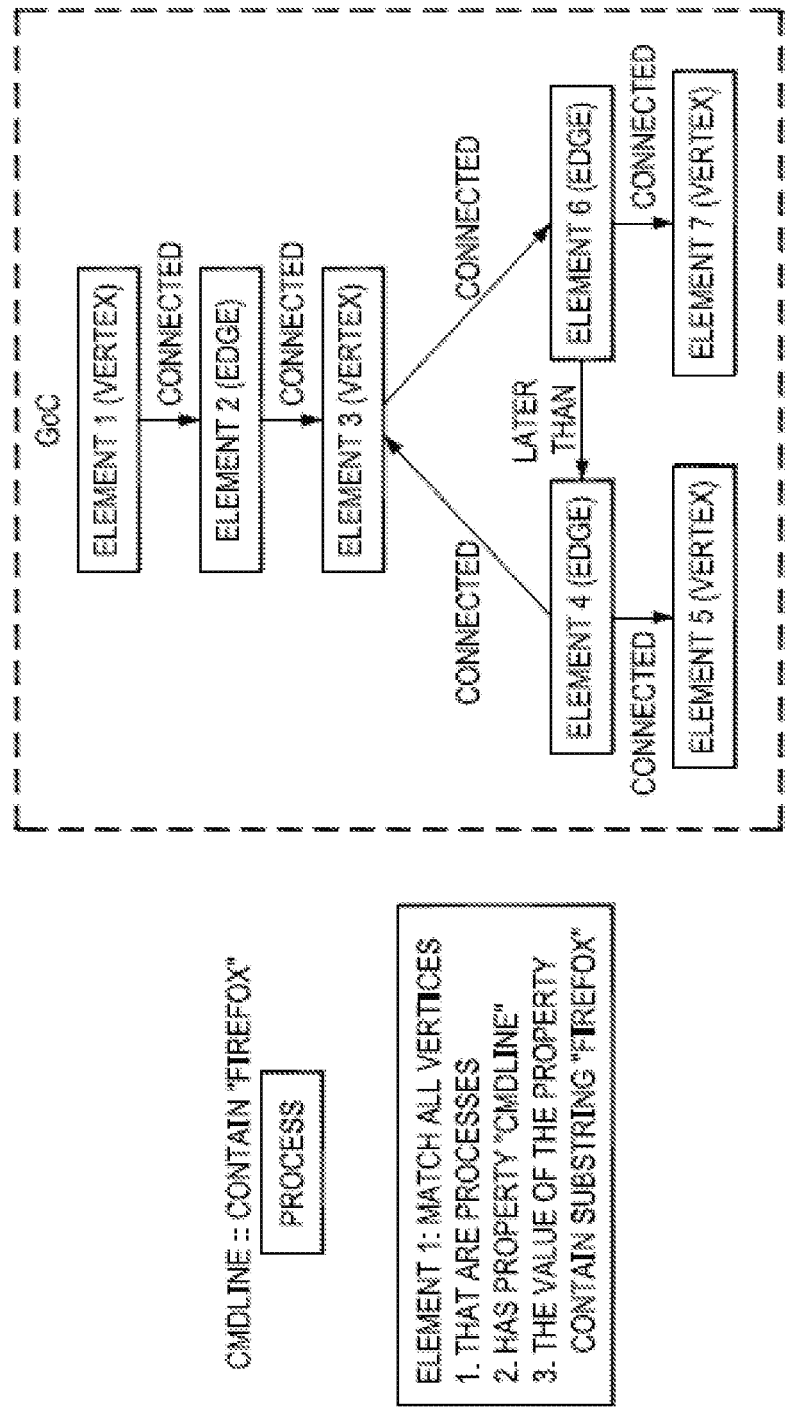
Figure 22:
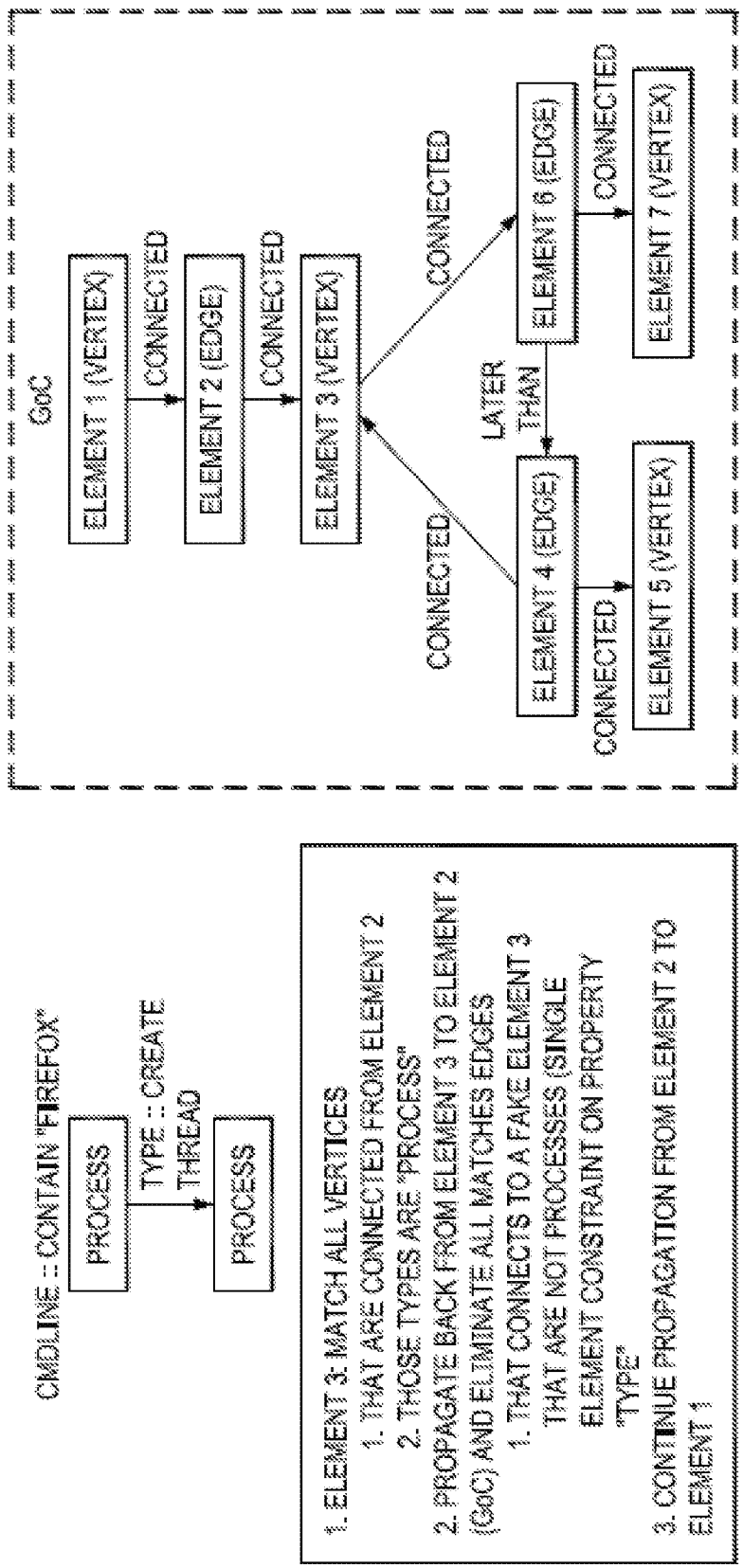
Figure 23:
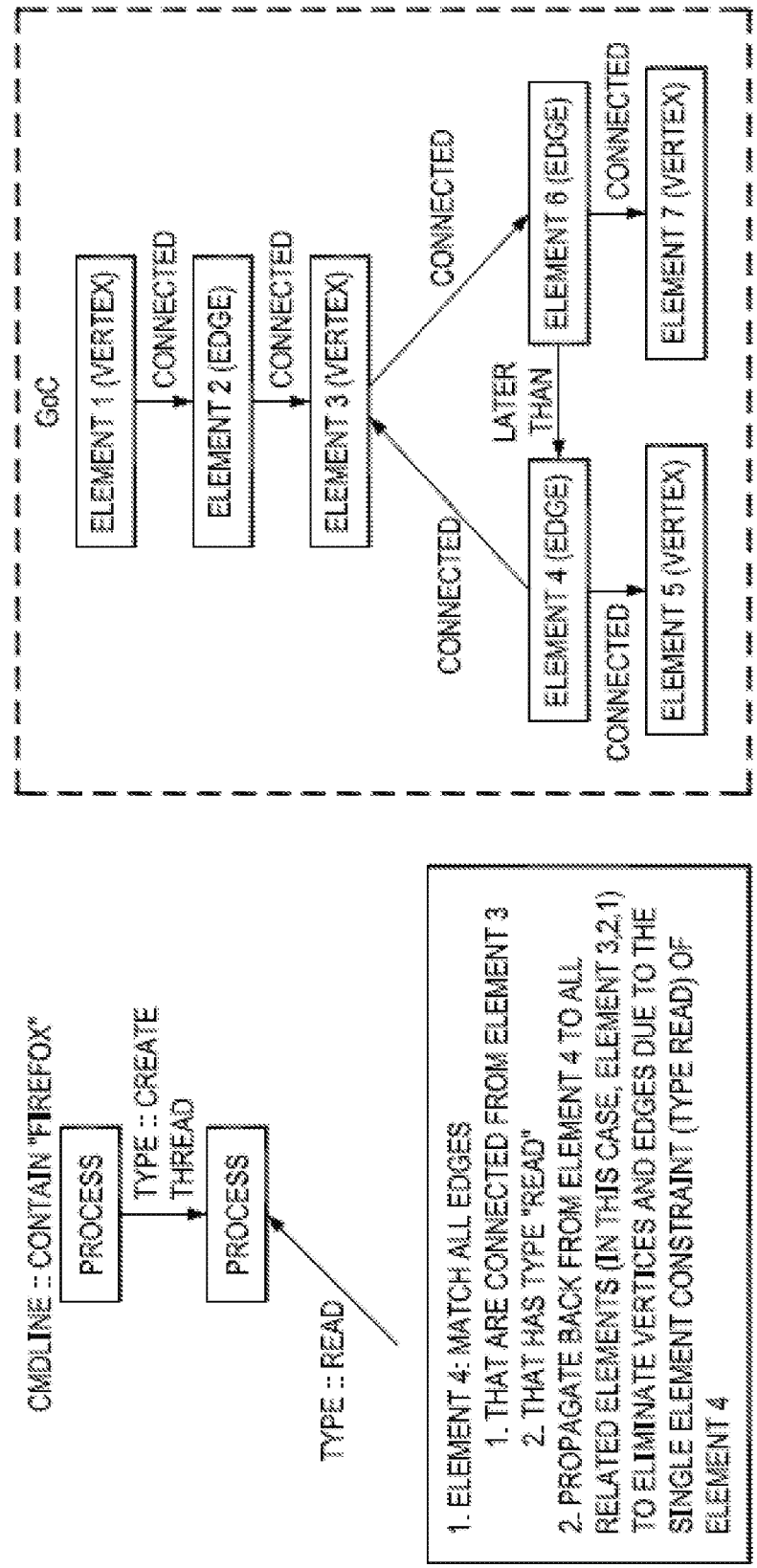

FIG. 19 depicts a representative example of a pattern graph 1900, and a corresponding GoC 1902. FIG. 19 thus corresponds to step 1800 in the process flow in FIG. 18. It should be noted that the GoC may be different from the pattern graph because some element relations may not be written explicitly in the pattern graph. With these examples, FIGS. 20-23 depict application of the iterative constraint solving process using the GoC and with respect to the pattern graph. In particular, FIG. 20 corresponds to step 1806 in the process flow. Here, the first element is matched (solved), by matching all vertices that are processes, that have the property "cmdline" where the value of the property contains the substring "firefox." FIG. 21, which corresponds to steps 1806 and 1808, depicts how the process then performs propagation, in this case from element 2 to element 1 (in the GoC) and eliminates all matched vertices in element 1 that do not have an element 2 to connect. This is the notion of removing subgraph instances that satisfy previous constraints but not necessarily the latest one. FIG. 22, which also corresponds to steps 1806 and 1808, depicts the further propagation operation, namely, propagating back from element 3 to element 2 (in the GoC) and eliminating all match edges that connect to a fake element 3 that are not processes (single element constraint on property "type"). FIG. 23, which also corresponds to steps 1806 and 1808, depicts a further propagation operation, namely, propagating back from element 4 to all related elements (in this case, elements 3, 2 and 1) to eliminate vertices and edges due to the single element constraint (type read) of element 4.

In general, according to this approach, the GoC is extracted and stored as a supplementary data structure of a pattern. During constraint propagation in an iteration, the GoC is traversed to propagate the impact of filtering from the variable(s) of the evaluated predicate to all other connected touched variables. There is no requirement that the activity graph on which the iterative constraint solver works is limited to an inter-process activity graph. The iterative constraint solving technique described above may be used for any type of activity graph, e.g., an activity graph representing activity data captured in association with a process, a host machine, a network of machines (e.g., wherein each entity is a host), and the like.

In addition, there is no requirement that the iterative constraint solving process be used just for cyber security reasoning, as the technique also may have applicability in other use cases that take advantage of graph pattern matching. Thus, the described approach (namely, serializing simple database queries for single graph element constraint solving and then performing iterative constraint propagation using a supplemental graph of constraints) may be implemented in any abstract graph pattern matching system.

Figure 24:
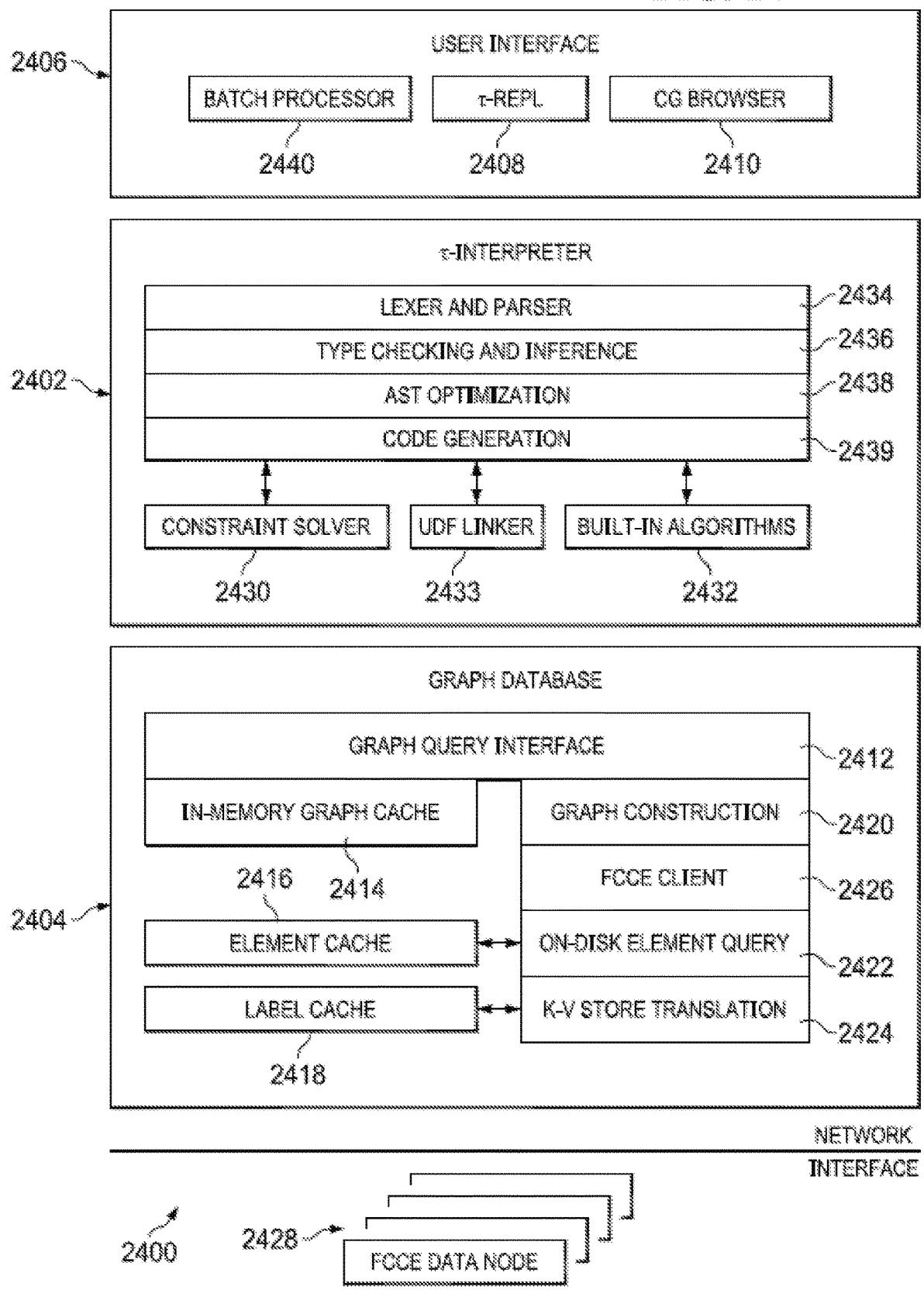
FIG. 24 depicts a representative graph computation platform in which the techniques of one or more illustrative embodiments may be implemented.

FIG. 24 is a block diagram of a representative architecture of a graph computation platform 2400 in which techniques according to one or more illustrative embodiments may be provided. The platform may be implemented in the intelligence center depicted in FIG. 8, in the security intelligence platform in FIG. 3, in the APT solution in FIG. 4, as a standalone functionality or application, as a network- or cloud-accessible service, or otherwise. As depicted, the platform 2400 comprises a language interpreter 2402, a graph database 2404, and user-interface components 2406. The user-interface components 2406 comprise an interactive console 2408, and a computation graph visualization tool (a browser) 2410. The user-interface components provide an interactive programming and data inspection environment for threat reasoning. The graph database 2404 preferably comprises a graph query interface 2412, an in-memory graph cache 2414, an element cache 2416, a label cache 2418, one or more graph construction routines 2420, an on-disk element query function 2422, a key-value store translation table 2424, and an FCCE client 2426. The FCCE client 2426 interfaces across the network to one or more FCCE data nodes 2428, which nodes store the graphs typically in a distributed manner. As previously noted, the graph database 2404 employs a distributed key-value store over the FCCE data nodes 2428 for long-term monitoring data storage with data locality optimization, and concurrent multi-source streaming data ingestion.

The interpreter 2402 comprises a number of functional elements including a code generation module 2439 that works with a constraint solver 2430, other built-in algorithms 2432, and a Universal Disk Format (UDF) linker 2433. Interpreter 2402 also includes a lexer/parser 2434, a type checking and inference module 2436, and an AST optimizer 2438.

The user interface also includes a batch processor 2440. The graph database 2404 stores both in-memory and on-disk pattern graph portions, and it provides graph query APIs (2412) to the interpreter 2402. The main functions of the graph database are to bridge the semantics of the pattern graph and low-level data storage, and to optimize graph retrieval throughput, preferably using multi-layer caches (2414, 2416, 2418) and data arrangement based on PG properties, such as temporal locality of events. As noted above, one such graph database solution that provides these features is FCCE. In particular, FCCE supports concurrent multi-source asynchronous ingestion, distributed data storage, and data locality management. To optimize graph queries based on pattern graph properties, an FCCE schema is used. This schema represents the pattern graph in key-value pairs, and certain values preferably are replicated in one or more schemas for data locality preservation and fast retrieval from different perspectives. Thus, for example, one replica of events may deal with temporal locality, wherein events are indexed by time, and events occurring within a time window are managed on one memory page and stored at consecutive filesystem blocks. Other event replicas may deal with labels and shared entities.

To process a graph query, the graph database first checks whether any portion of the data is already loaded into memory through previous queries. If not, the database splits the graph query into one or more on-disk element queries, each of which is to be translated into key-value queries that the graph database (e.g., FCCE) can process. Labels are expressed as dictionary items to express complex element attributes. In an example operation, a simple element query searching for file entities whose path contains a substring "firefox" translates into two graph database queries: the first searches for all satisfied labels, and the second searches for raw data to construct elements associated with these labels. When raw data is retrieved from disk, preferably buckets of key-value pairs are first cached in a graph database client where data within a bucket preferably has tight data locality and high probability to be queried in the same high-level graph query or following queries. Then, different components of an element are constructed and some are cached for frequent referencing, e.g., the principal label for processes containing multiple pieces of information including the username, uid, group, etc., and it is cached as a reference. Next, elements are constructed and cached. Lastly, the requested graph is assembled and returned.

Fuzzy Cyber Detection Pattern Matching

As described above, the activity graph (AG) typically expresses computations on one or more computing devices (which may include the endpoint) as a temporal graph, referred to herein also as a computation graph (CG), as it represents an abstraction of the computations. As previously described, the basic elements of an AG/CG are entities (e.g., processes, files, network sockets, registry keys, GPS sensor, accelerometer, etc.), and events (e.g., file read, process fork, etc.), where the entity is any system element that can either send or receive information and the event is any information/control flow that connects two or more entities. Events are information flows between entities in a pair of entities at specific times and can be captured in the form of system calls or the like. An event has a unique timestamp (when it happens), and an information flow direction (directional, bi-directional, non-directional). The above described mechanisms according to one or more of the illustrative embodiments uses an iterative constraint solver to perform pattern matching in the AG/CG, based on a pattern graph (PG) and/or graph of constraints (GoC), and thereby identify or detect potential intrusions, identify or detect cyberattacks or cyberthreats, perform cyber forensics, and perform cyber reasoning.

With graph pattern matching, a variety of human knowledge regarding patterns of activity is encoded into different patterns, which are graphs of the target subgraphs in the AG/CG. While it is a beneficial practice to have a complete recording of computational activities in the AG/CG, and it is a good practice to precisely describe what security developers and analysts are looking for with regard to intrusions, attacks, threats, etc., using patterns, the assumption that the AG/CG represents a complete recording, and that the security developers and analysts have precise knowledge of the intrusions, attacks, or threats such that their knowledge may be represented in pattern graphs (PGs), is not always realistic. For example, the AG/CG may in fact be incomplete in many real-world instances. Moreover, a developer or analyst may only have a skeleton of a pattern in mind instead of the exact pattern of a potential instruction, attack, or threat that needs to be identified in AG/CG representations. Furthermore, it would be beneficial to be able to detect variants of an intrusion, attack, or threat defined by a given pattern graph. In each of these cases, requiring an exact matching of a pattern graph to sub-graphs within the AG/CG is a limitation that either makes pattern matching less effective or less analyst/developer friendly.

In a further aspect of the illustrative embodiments, rather than requiring exact pattern matching of a pattern graph (PG) to a sub-graph of the AG/CG, the illustrative embodiments provide mechanisms for performing a fuzzy or inexact graph pattern matching given a temporal graph, such as the AG/CG, which expands through time, and given a pattern graph (PG) which may generally define the target sub-graphs to return, e.g., the patterns representative of cyberattacks/cyber threats or unauthorized intrusions, sometimes collectively referred to as cyber incidents. With regard to these further aspects of the illustrative embodiments, a training module and a matching module are provided in which the training module continuously (within a given period of time) inspects the growing AG/CG at specified time intervals and dissects the streaming AG/CG into incremental graph sections. Each graph section is treated as an individual training sample. A filter with parameters to be learned is then applied to each training sample with convolution computation, sliding the filter through the training sample to learn at different positions. In this way, the filter represents a graph embedding technique which does not need to deal with the special nature of the temporal graph and can leverage graph embedding algorithms such as node2vec or graph neural network (GNN).

The filter captures both the topological features of the graph as well as the attribute features of the vertices (nodes)/edges (activities or events). The goal is to learn the parameters of the filter, which constructs a good embedding for sub-graphs. In some illustrative embodiments, the filter can slide on an entity and covers a time span. In this way, the sub-graph covered by the filter can be represented by the neighborhood of that entity within a time range. The filters learn a good embedding for a node/entity instead of a complex sub-graph.

The matching module only runs in response to a pattern graph (PG) being provided, e.g., by a user via a user interface or other source such as an automated computing component, and similar sub-graphs that match the given pattern graph (PG) are to be identified in the AG/CG. The matching module selects an appropriate filter, applies the selected filter to the pattern to obtain its embedding, and searches for a similar sub-graph in the embedding space. Then, the matching module maps the retrieved embeddings back to the graph space and outputs the fuzzily matches sub-graphs.

Figure 25:
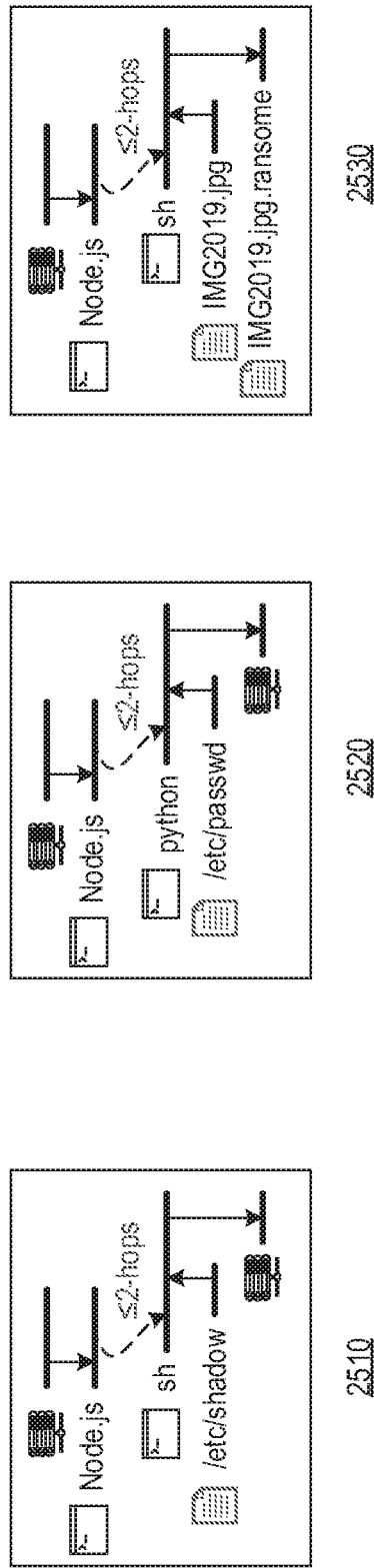
FIG. 25 shows an example of a pattern, used to define a pattern representative of an intrusion, attack, or threat, and two fuzzily matched sub-graphs in accordance with one illustrative embodiment.

As noted above, the output of these mechanisms according to the further aspect of the illustrative embodiments, is a set of sub-graphs which are similar to the pattern graph (PG) but do not need to be exactly the same or isomorphic to the given pattern. For example, FIG. 25 shows an example of a pattern 2510, used to define a pattern representative of an intrusion, attack, or threat, and two fuzzily matched sub-graphs 2520 and 2530, or an AG/CG (not shown), which may be matched to this pattern 2510 by way of the fuzzy matching mechanisms of the illustrative embodiments. It should be appreciated that in these graphs, the horizontal lines represent entities and the arrows between horizontal lines represent events, with the direction of the arrows representing the direction of system calls or the like, corresponding to those events. The horizontal lines to represent entities is for matter of convenience in the graph so that events can be shown as arrows connecting two horizontal likes indicating events between the connected entities.

As shown in FIG. 25, the fuzzily matched sub-graphs 2520 and 2530 do not exactly match the original pattern graph 2510 at least with regard to particular entities and/or events between entities. For example, fuzzily matched sub-graph 2520 differs from the original pattern graph 2510 in that instead of the "sh" entity, there is a "python" entity, and instead of the entity "/etc/shadow" there is an entity "/etc/passwd". Similarly, fuzzily matched sub-graph 2530 differs from the original pattern graph 2510 in that instead of the entity "/etc/shadow", the entity "IMG2019.jpg" is present and instead of the bottom entity (unnamed in the pattern graph 2510), there is an entity "IMG2019.jpg.ransome."

In previous pattern matching methodologies, such differences in the pattern and the sub-graphs would result in the sub-graphs not being returned as potential intrusions, attacks, or threats because there is not an exact match between the pattern graph 2510 and the sub-graphs 2520, 2530. However, as will be described in greater detail hereafter, the illustrative embodiments, according to a further aspect, provide mechanisms for performing such fuzzy matching in pattern graphs and AGs/CGs such that such similar sub-graphs may be identified. This permits incomplete pattern graphs, e.g., when some knowledge is not available to the analysts or developers, to be used as a basis for matching, pattern graphs with mistaken information to be utilized, or similar pattern graphs for a known attack campaign to be used to identify similar attack subgraphs in AGs/CGs, even when there is not an exact match.

It should be appreciated that the exact temporal graph pattern matching, such as previously described above, operates in the original graph space of the AGs/CGs and the pattern graph (PG) using the tools and mechanisms described previously, e.g. the graph database, multi-aspect locality caching, dynamic programming for pattern matching, the graph of constraints (CoG), iterative constraint solver etc. On the other hand, the fuzzy temporal graph pattern matching of the further aspects of the illustrative embodiments operates by transforming the matching space from the original graph space to a vector space using a convolution (an operation on the spaces indicating how the shape of one is modified by the other) on the temporal graphs, sub-graph embedding using a trained neural network, and continuous learning on evolving graphs.

Figure 26:
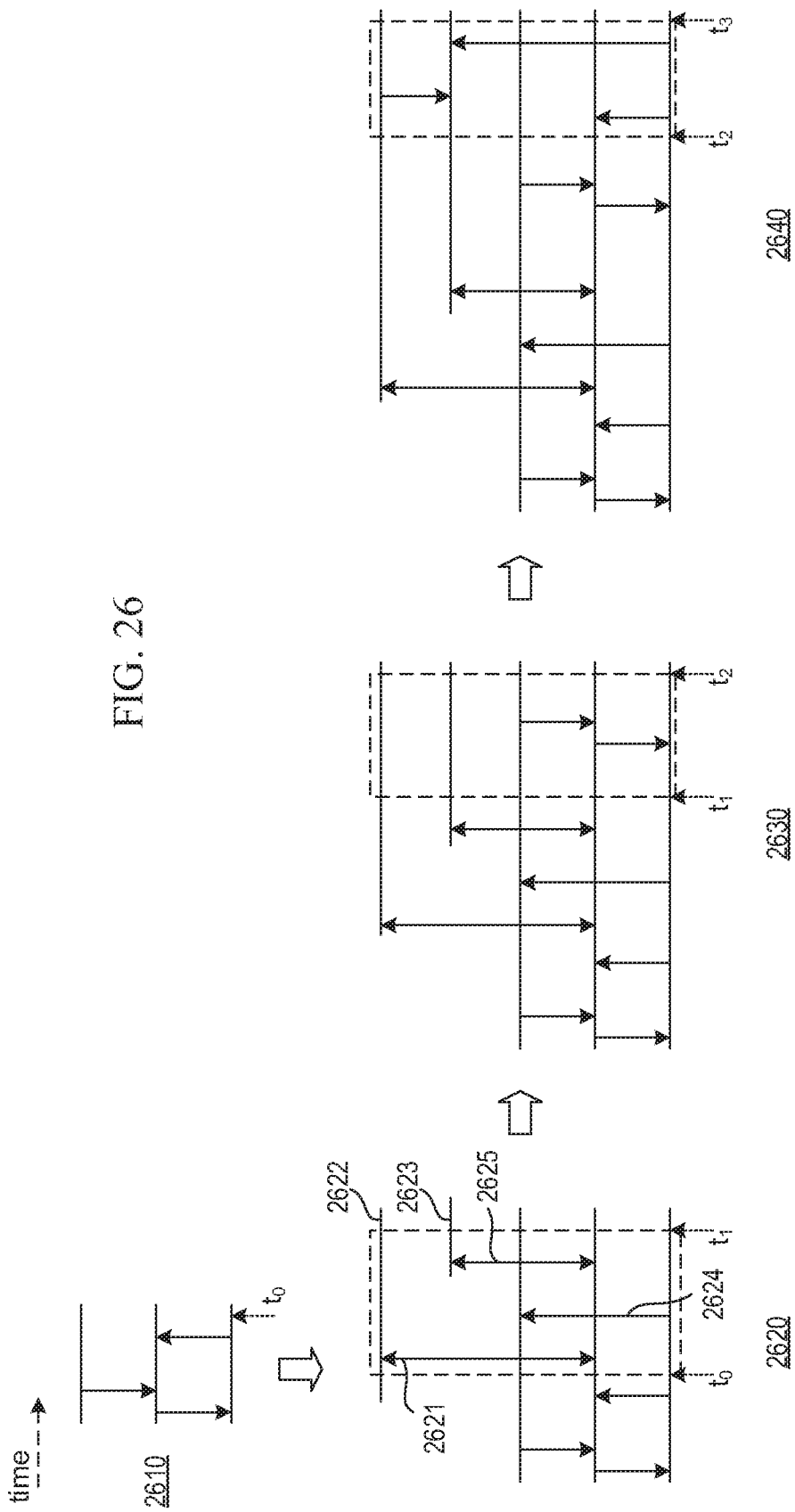
FIG. 26 is an example diagram illustrating a dynamically growing temporal graph in accordance with one illustrative embodiment.

The fuzzy temporal graph pattern matching operates on a dynamically growing temporal graph, e.g., AG/CG, in which new portions of the graph are added over time. FIG. 26 is an example diagram illustrating such a dynamically growing temporal graph, again with horizontal lines representing entities in an AG/CG, and vertical arrows, or edges, representing events. As shown in FIG. 26, during a first time point t0, the temporal graph, e.g., AG/CG is as shown in element 2610. At a later time t1, the temporal graph will look as shown in element 2620 with additional nodes and events 2621-2625 being present due to additional activity between entities occurring from time t0 to time t1. The same is true for further time points t2 and t3 as shown in elements 2630 and 2640 of FIG. 26. At each time point, the portion of the temporal graph denoted by the dashed box represents the new portion of the temporal graph that is to be processed to determine if it alone, or in combination with the previously processed graph portion, comprises a sub-graph matching a pattern graph indicative of an intrusion, attack, or threat.

Figure 27:
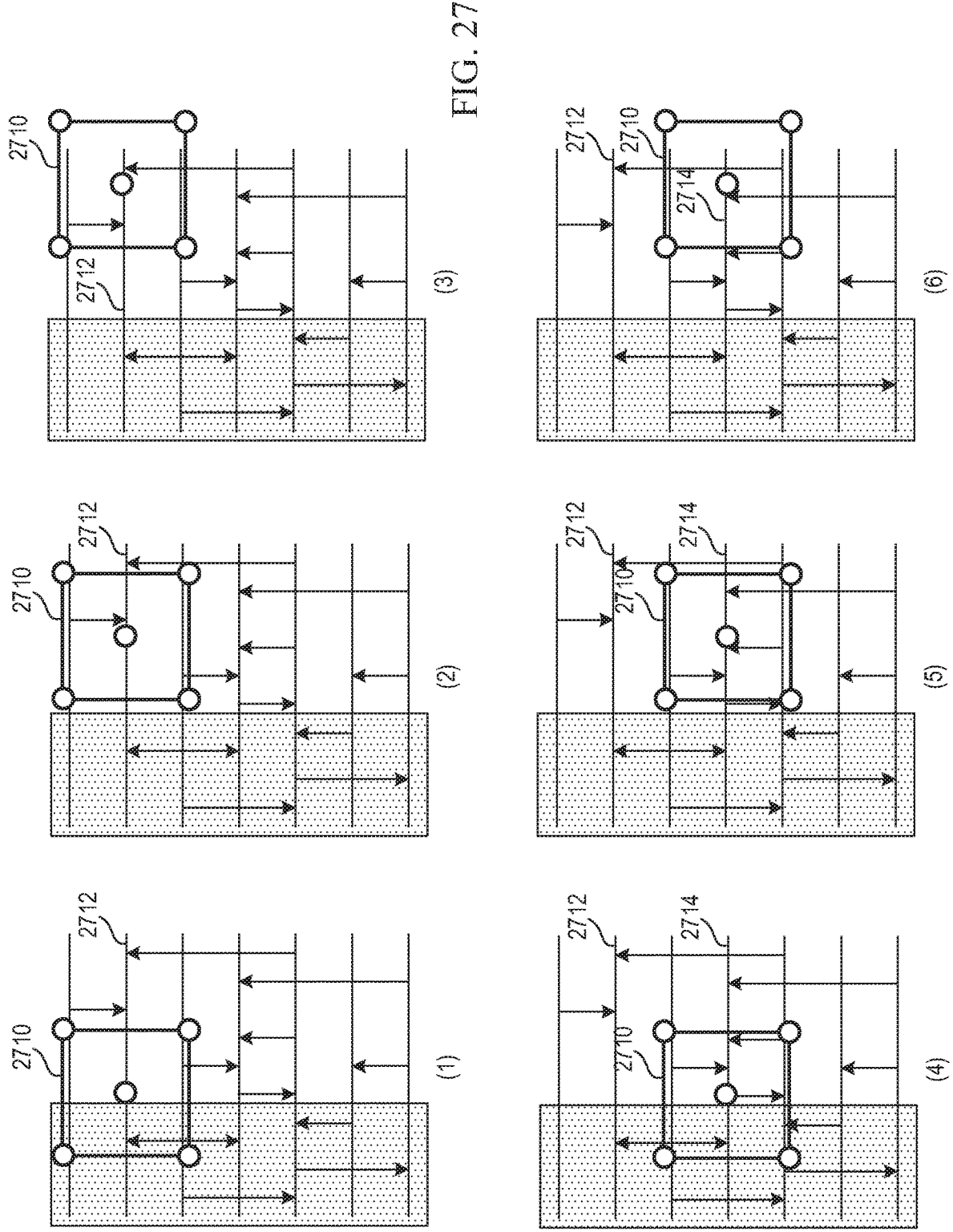
FIG. 27 is an example diagram graphically depicting a process for extracting information from sub-graphs of the temporal graph, e.g., AG/CG, using a moving convolution filter.

FIG. 27 is an example diagram graphically depicting a process for extracting information from sub-graphs of the temporal graph, e.g., AG/CG, using a moving convolution filter. The process shown in FIG. 27 may be performed at predetermined time points, e.g., t0, t1, t2, etc., in which the nodes and events occurring since a previous time point at which the process was executed, are evaluated to generate vector representations of the nodes and events occurring between the time points, e.g., during the time period represented as the dashed boxes in FIG. 26. This process gathers the vector representations within that window so that they may be compared to vector representations of pattern graphs indicative of intrusions, attacks, or threats, or simply activity which an analyst, developer, or automated computing component wishes to search for in a temporal graph.

As shown in FIG. 27, a convolution filter 2710, shown as a moving filter window 2710 in FIG. 27, is defined and centered on an entity (horizontal line) of the temporal graph. The sub-graph within the moving filter window is computed as a vector, i.e. a graph embedding. Graph embedding is a generally known technique for transforming nodes, edges, and their features into a vector space while maximally preserving properties, like graph structure, for example. Machine learning algorithms may operate on this vector space representation generated by the graph embedding. Such embeddings can be performed at various levels, such as the node level, the sub-graph level, or the like.

In the example shown in FIG. 27, the filter 2710, is moving with its center on a selected entity 2712, and with the sub-graph of the filter window being summarized around that center entity 2712. As the filter 2710 is moved along the selected entity 2712 in the temporal graph, from a previous time point where embedding is performed, to a second time point where the current embedding is being performed, the vector representation of the filter window corresponding to the filter 2712 is generated and stored for the range of temporal points of the filter window. That is, the graph embedding is implemented as a convolution filter 2710 with temporal boundaries, e.g., how many time points (horizontal axis) are included in the filter window, and reachability limits, e.g., how many direct/indirect events to/from the selected entity 2712, are within the filter window (vertical axis). Various filters of various sizes may be defined for performing the embedding of the temporal graph, e.g., filters of size 1-hop, 2-hop, 3-hops around the center selected entity, smaller/larger time intervals, etc. Thus, the horizontal bounds of the filter window 2710 are defined by the range of time points desired for the implementation and the vertical bounds of the filter window 2710 are defined by the reachability limit, e.g., number of hops away from the center entity, e.g., 2712 or 2714 in FIG. 27, for which events are to be considered for embedding purposes.

By limiting the problem to a node embedding with temporal boundaries and reachability limits, a non-temporal graph node embedding mechanism may be used to perform the embedding of the information within the filter window. For example, a node2vec embedding (distance embedding), graph convolution network (GCN) embedding (where the graph is represented as a normalized graph Laplacian matrix), a graph neural network (where the neighborhood of a vertex is summarized based on the summarization of its connected vertices (in layers)), or the like may be used to perform the actual embedding of the information contained within the filter window.

In an implementation using a GCN, or graph neural network (GNN), to embed a graph to a vector, values are first assigned to the weight matrices (parameters of neurons) in the GCN/GNN. It is important to train these values such that the values are good enough that the embedding generated preserves similarities between similar graphs (portions of the CG/AG or PGs). The procedure to find these good neuron value parameters, or weights, is referred to as "training" and thus, the GCN/GNN is trained to generate these weight matrices. Once trained, the GCN/GNN can be used to perform the embedding of the moving filter window 2710. This training may be an unsupervised training in which the training data is previously seen CGs/AGs and PGs, for example, and the training uses a defined loss function, which may be defined by a user, and which is then minimized via epochs of the training process. An example of one loss function is a loss function that encourages nearby nodes to have similar embeddings, such as described in Hamilton et al., "Inductive Representation Learning on Large Graphs," Advances in Neural Information Processing Systems, pp. 1024-1034, 2017. This is only one example of a loss function and is not intended to be limiting on the present invention. Any type of loss function that is desired for the particular desired implementation may be used without departing from the spirit and scope of the present invention.

As shown in FIG. 27, the center selected entity 2712 may then be iterated a specified number of entities in the temporal graph according to the size of the filter, e.g., the number of "hops" of the filter. For example, the depictions of the moving filter window in time points (1)-(3) are with regard to selected entity 2712 from a first time point (shown a (1)) to a second time point (shown as (2)), and a third time point (shown as (3)). Once the movement of the filter window reaches the temporal boundary, the filter window is re-centered on a new selected entity, such as selected entity 2714, and the process is repeated as shown with regard to time points (4)-(6) in FIG. 27.

This process results in vector representations of the temporal graphs based on a distance embedding technique, such as node2vec, or embedding performed by trained neural network mechanisms, such as GNNs or a multi-layer CNN, for example. For example, in one illustrative embodiment, different convolutional filters are defined having different sizes and multiple GNNs, each with one filter, are continuously trained. Assuming that the process results in vector representations of the portions of the temporal graph, a fuzzy matching of the vector representations of the moving filter 2710 over the CG/AG, with a vector representation of a given pattern graph (PG), is performed to determine if there is a sufficient match, i.e. a search for nearby vectors in the vector space is performed.

That is, the search for "nearby" vectors is one which looks for a portion (i.e. "graph patch") of the pattern graph (PG) that looks similar to the portion of the graph currently under the moving filter 2710 in the CG/AG, e.g., similar topography, similar node/edge attributes, etc. The similar graph patch may be close or remote in the CG/AG, but it is similar in attributes as represented by the vector embedding. A "nearby vector" technique for comparison of the vector representations, or embeddings, of the graph patches is used to determine for each vector slot of the vector representations, how close or far away from each other the vector representations are, i.e. the distance between the values in the vector slots of the vector representations, and thereby generate a measure of similarity of the two vector representations. The measure of similarity may be compared to a threshold measure of similarity to determine if two vectors are the same within a given tolerance to one another, and thus, determine that they are similar or not, i.e. are "nearby" vectors or not. The "nearby vector" approach allows for a less computation intensive approach operating in a vector space, than the relatively more computation intensive approach of determining how similar or dissimilar graphs are in the graph space. Thus, with the nearby vector approach, the graphs are embedded into vectors to search for nearby vectors using a fuzzy or inexact graph pattern matching. Any currently known, or later developed, approach for computing distances between vectors in a high-dimensional vector space may be used to actually calculate the distances between vectors and thus, identify which vectors are "nearby". In one illustrative embodiment, a Euclidean distance measurement or cosine similarity measurement may be used to identify distances which can then be used along with defined threshold levels of distance to identify similar or "nearby" vectors.

For the nearby vectors that are found through this fuzzy or inexact matching process, the nearby vectors are mapped back from the vector space to the graph space, and particularly to the sub-graph instances. For example, in one illustrative embodiment, a mapping/lookup table (e.g., such as a Vec2Graph mapping 3220 in FIG. 31 hereafter) which maps vector slot values, or combinations of vector slot values, to corresponding nodes/edges, may be maintained when the embedding is processed and thus, the vector values may be looked up in this table and used to recreate the corresponding nodes and edges of the sub-graph. The sub-graph instances generated by this mapping back to the graph space are then stored for use in identifying potential attacks or threats, such as by presenting the sub-graphs via interfaces of the cyber security intelligence center to analysts or developers to determine if the sub-graph instances are actual attacks, threats, or unwanted intrusions.

Figure 28:
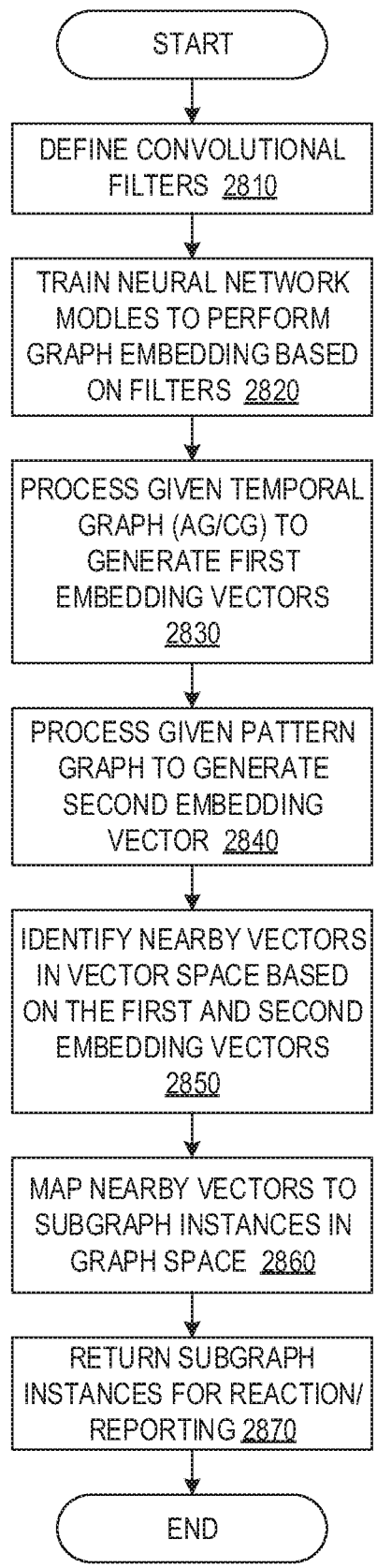
FIG. 28 is an example flow diagram outlining an example generalized operation for performing fuzzy matching in accordance with one illustrative embodiment.

As noted above, the actual fuzzy or inexact matching process may be implemented using a node2vec, multiple GNNs with each having a particular one of the multiple defined filters, or the like. FIG. 28 is an example flow diagram outlining an example generalized operation for performing fuzzy matching in accordance with one illustrative embodiment. FIG. 28 assumes that the embedding is performed using a trained graph neural network model as opposed to a simpler distance based neural network model embedding, such as node2vec. However, it should be appreciated that the illustrative embodiments may be implemented using a distance based neural network model embedding as opposed to a trained graph neural network model based mechanism without departing from the spirit and scope of the present invention. That is, while in some illustrative embodiments, the trained GNN approach is preferred because it is more precise and able to embed more complex sets of attributes relative to the node2vec embodiments, which are relatively simpler but are limited to providing information about topology, e.g., node/edge attributes, in other illustrative embodiments, the node2vec embodiments may be utilized.

The operation outlined in FIG. 28 may be implemented, for example, by the attack sub-graph matching 830 in FIGS. 8 and 14, for example, in which the malicious patterns correspond to a given pattern graph (PG) for an intrusion, attack, or threat, that is matched to patterns present in the inter-process activity graph (AG) or computation graph (CG). The process shown in FIG. 14 in steps 5.1 and 5.2 may be replaced with a new fuzzy matching process (or algorithm) in accordance with FIG. 28, for example.

As shown in FIG. 28, the process starts with the definition of filters of different sizes (step 2810). Multiple different sizes of filters are used to perform the embeddings at different graph patch sizes. Because the mechanisms of the illustrative embodiments may not know how large the PG is when one is provided as a basis for the fuzzy or inexact matching, different size filters permit accommodation of various size PGs, i.e. different sizes of PGs need different sizes of filters, which corresponds to different graph patch sizes on the CG/AG for the vector encoding. For example, 1-hop, 2-hop, 3-hop, and different time range based filters may be defined for use in performing the graph embedding of a windowed portion of an AG/CG and/or the pattern graph, as a vector representation. It should be appreciated, however, that is some illustrative embodiments where a single graph patch size is required and known ahead of time, a single size filter may be utilized. The illustrative embodiments of the present invention may utilize a single size filter or multiple filters of different sizes without departing from the spirit and scope of the present invention.

One or more neural network models are trained to perform the graph embedding, based on the defined filters, and generate the vector representations (step 2820). This training involves an initial training of the neural network based on a training dataset which may be based on known CGs/AGs and PGs. That is, for example, an initial set of one or more CGs/AGs may be obtained from monitoring of computer resources and one or more existing PGs (knowledge to search) may be defined by analysts for use in training the GCN/GNN with one or more filters in the particular embodiment. For example, the GCN/GNN may operate on the CGs/AGs and PGs to determine whether there is a matching sub-graph within the CGs/AGs to the PGs and a corresponding output generate. Thereafter, a determination is made as to whether the GCN/GNN generated a correct output based on a loss function and if not, the operational parameters, e.g., weights, of the GCN/GNN are adjusted so as to minimize the loss function through epochs or iterations until a predetermined threshold level of loss or error is obtained for the GCN/GNN. Once trained, the GCN/GNN may be executed at substantially the same time as a monitored computer system runs, so that the trained GCN/GNN can embed new-coming CGs/AGs and PGs and return similar graph portions of CGs/AGs according to the PGs.

That is, given an input AG/CG, as described previously, the AG/CG is processed by the trained neural network(s) using the defined filter(s) to generate one or more first embedding vectors (step 2830). For example, in one illustrative embodiment, multiple graph convolution networks (GNNs) may be trained, each implementing one of the defined filters, and a selected one of the GNNs may be applied to the AG/CG in accordance with the size of the filter and the size of the given graph pattern. In another illustrative embodiment, a single multi-layer convolutional neural network may be used with layers corresponding to different size filters and the fuzzy pattern matching task performing convolution on the pattern graph similar to the AG/CG until a layer where one filter covers the entire pattern in the pattern graph.

The selected filter size is used to generate the embedding vector of the pattern in the pattern graph to thereby generate a second embedding vector (step 2840). The second embedding vector is used to search for nearby vectors in the vector space of the AG/CG generated by the application of the corresponding trained neural network (step 2850). Any nearby vectors found in the vector space are then mapped back to sub-graph instances of the corresponding AG/CG (step 2860). The sub-graph instances are then returned for reaction and reporting operations (step 2870). For example, as shown in FIG. 14 as steps 6.2 and 6.1.2, different reactions and reporting may be implemented, such as raising alerts, terminating involved processes, delaying process requests, limiting resources, e.g., disk/network access, submitting suspicious sub-graphs for further evaluation by an analyst, or the like. The operation then terminates. Although the process shows a termination, it should be appreciated that this process may be repeated, such as in a seemingly continuous manner, at additional time points or at particular predefined time intervals, in response to user or automated computing component requests, upon the occurrence of a predefined event, or the like. Moreover, the process may be performed for each of a plurality of different pattern graphs, i.e. different defined intrusions, attacks, or threats, for which pattern matching is to be performed.

As discussed herein, the mechanisms of the additional fuzzy or inexact matching based illustrative embodiments identify similar portions or patches of CGs/AGs compared to one or more PGs representative of potential cyberattacks, cyber threats, or the like, or even just pattern graphs of particular interest to system analysts, administrators, or other authorized persons or other computing system resources, e.g., other computing algorithms that may operate based on the identification of similar portions of patches of CGs/AGs. It should be appreciated that when finding similar portions or patches of CGs/AGs, depending on the desired implementation, either a single vector output corresponding to a nearest vector to the vector representing the PG may be returned, or a top-k number of nearest vectors may be returned. In these cases, the nearest or top-k number of nearest vectors may be mapped back to similar sub-graph patches in the CGs/AGs, as described previously. Moreover, in some illustrative embodiments, a user may specify a distance threshold and all vectors within this threshold, i.e. all vectors that are similar to the PG vector within this threshold distance, may be returned as results and mapped back to the sub-graph portions or patches of the CGs/AGs.

Figure 29:
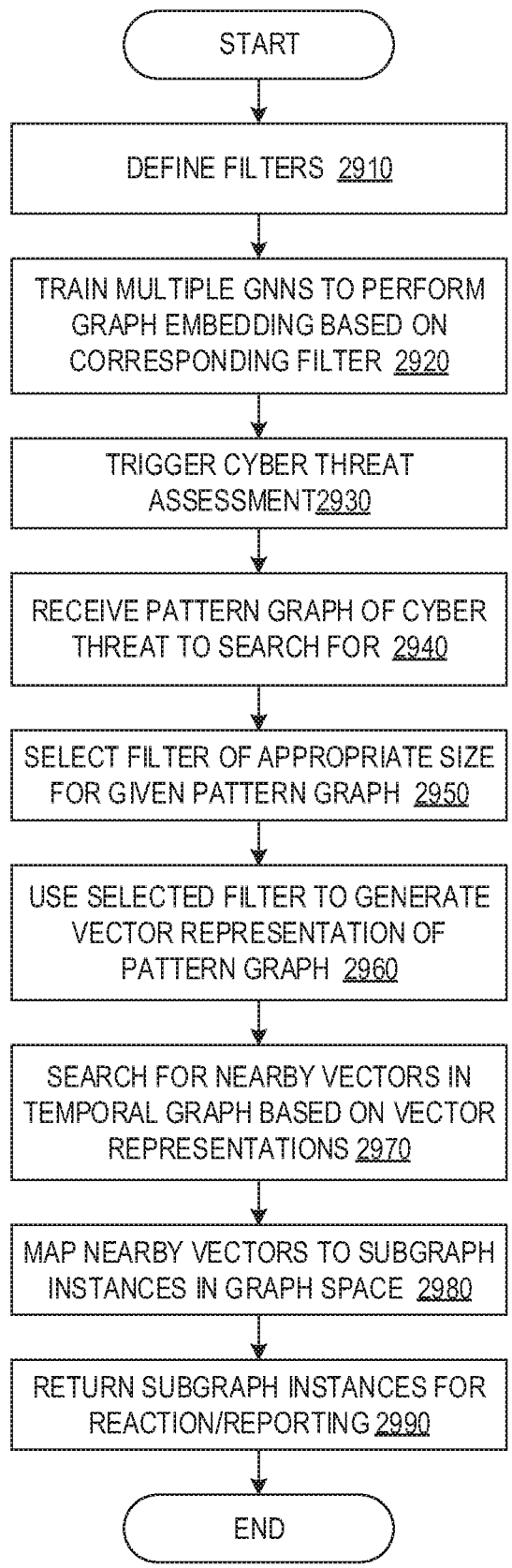
FIG. 29 is a flowchart outlining an example fuzzy matching operation in accordance with one illustrative embodiment in which multiple graph neural networks (GNNs) are implemented to perform the embedding.

FIG. 29 is a flowchart outlining an example fuzzy matching operation in accordance with one illustrative embodiment in which multiple graph neural networks (GNNs) are implemented to perform the embedding. As shown in FIG. 29, the process again starts with the definition of filters of different sizes (step 2910). Multiple GNNs are trained with each GNN implementing a single one of the filters defined in step 2910 (step 2920). In response to a triggering of a process to perform cyber threat assessments of an activity graph representing events occurring with regard to entities of a computing system (step 2930), a given pattern graph (PG) is provided (step 2940). A filter having a corresponding filter size to the size of the pattern graph is selected, e.g., a filter that is not too small or too much larger, in terms of numbers of hops or range of time, than the pattern in the pattern graph (step 2950). The size of the selected filter may be chosen as a smallest size filter that encompasses the size of the pattern graph, for example.

The selected filter is used to generate a vector representation of the pattern graph, i.e. compute the embedding vector of the pattern (step 2960) which is then used to search for nearby vectors in the AG/CG in the vector space (step 2970). The identified nearby vectors are then mapped back to the subgraph instances in the AG/CG (step 2980) and the sub-graph instances are returned for further reaction and reporting (step 2990). The operation then terminates.

Figure 30:
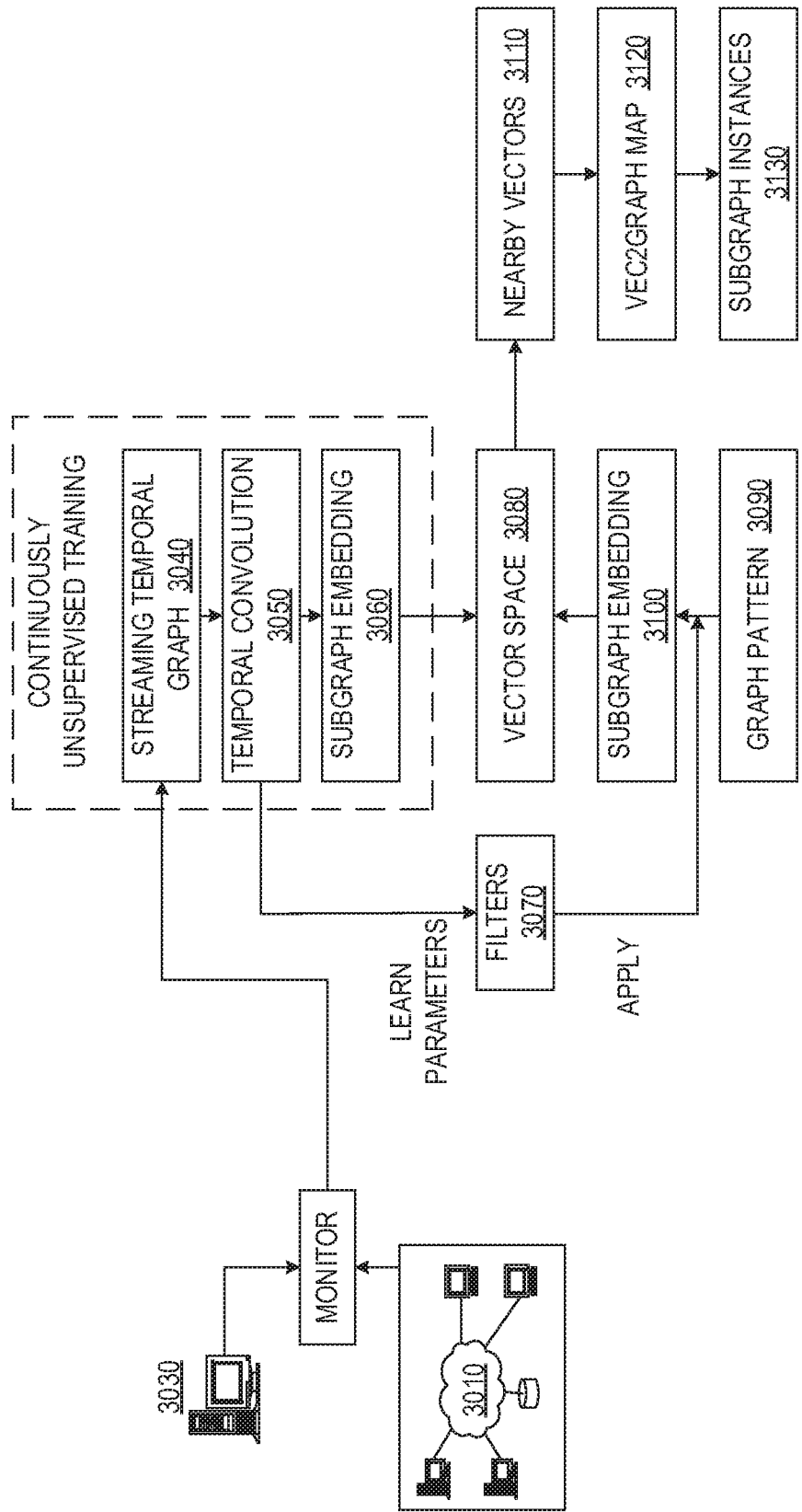
FIG. 30 shows an example system design and process flow for performing fuzzy cyber detection pattern matching in accordance with one illustrative embodiment.

FIG. 30 shows an example system design and process flow for performing fuzzy cyber detection pattern matching in accordance with one illustrative embodiment. As shown in FIG. 30, endpoints in a monitored network 3010 are monitored by a monitoring process 3020 of a SIEM system 3030 so as to perform inter-process activity extraction, e.g., monitoring 818, labeling 820, and ingesting 824 in FIG. 8 to generate an inter-process activity graph 828 referred to in FIG. 31 as the streaming temporal graph 3040. This monitoring 3020 and generation of the temporal graph 3040 may be perform continuously such that the temporal graph 3040 dynamically grows and the processes of the illustrative embodiments for performing fuzzy cyber detection pattern matching may be performed at specified intervals based on the state of the temporal graph 3040 at the particular time point relative to a previous time point at which the fuzzy cyber detection pattern matching was performed.

A temporal convolution operation 3050 using one or more filters and the moving filter window approach described previously is performed on the temporal graph 3040 to learn parameters of filters 3070 and generate subgraph embeddings 3060. The term "temporal convolution" refers to a convolution over time. Rather than performing a convolution on a temporal graph for a specific moment (snapshot of graph at that moment), the illustrative embodiments provide mechanisms to perform convolution to take into account the changing graph through time by structuring the temporal graph as a two dimensional grid with one axis as time and the other as space. Thus, the operations 3040-3060 may be performed continuously as the temporal graph grows dynamically. Moreover, the learning performed by the neural networks used to implement the temporal convolution operation 3050 may be continuously trained in an unsupervised manner using an unsupervised machine learning process.

The subgraph embedding 3060 is used to generate vectors in a vector space 3080 that may be used for identifying nearby vectors to a given pattern graph 3090. That is, a filter 3070 corresponding to the size of the given pattern graph 3090 is applied to the pattern graph to generate a subgraph embedding 3100 of the pattern graph 3090 that is also used to generate a vector representation in the vector space 3080. Based on the vector representations in the vector space 3080, nearby vectors 3110 that are nearby the subgraph embedding 3100 of the pattern graph 3090 are identified. The nearby vectors 3110 are mapped back to corresponding sub-graphs using a vector to graph mapping operation 3120. The resulting subgraph instances 3130 are then output for further reaction and reporting operations.

The approaches described herein are designed, in some illustrative embodiments, to be implemented in an automated manner within or in association with a security system, such as a SIEM, an APT solution, an endpoint management solution, and others. The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2, for example) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The mechanisms described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements, with the understanding that embodiments employing software components have the software components executed on hardware such that the software components specifically configure the hardware components to be special purpose hardware components specifically configured to perform the operations corresponding to the software components. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. In some embodiments, the instructions or code may be stored in a computer readable storage medium in a server data processing system and adapted to be downloaded over a network to a remote data processing system for use in a computer readable storage medium within the remote system. In a representative embodiment, the graph generation techniques are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution. While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, among others: endpoint management systems, Advanced Persistent Threat (APT) solutions, security incident and event management (SIEM) systems, as well as improvements to knowledge graph-based cyber-analytics, including threat hunting. Cyber threat hunting is the process of proactively and iteratively formulating and validating threat hypotheses based on security-relevant observations and domain knowledge. The approach herein facilitates such activities by modeling threat discovery as a graph computation problem. Indeed, given a process graph that records objective computation histories regarding both intrusive and non-intrusive data, threat discovery reduces to the graph query problem of iteratively computing a closure over a subset of security-related subgraphs in the process graph, and then finally yielding the subgraph that describes the threat of intrusion. Graph queries can be pre-programmed into intrusion detection systems or behavior anomaly detection systems, or the like. Threat hunting composes sequences of graph queries to iteratively and interactively conceive, verify, revise and confirm threat hypotheses. The graph building and matching techniques herein may be used to discover and act upon inter-process activity in other than an enterprise endpoint machine. The techniques herein may also be used on an intra-process basis.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for identifying a pattern of computing resource activity of interest, in activity data characterizing activities of computer system elements, the method comprising:
    receiving, by the data processing system, the activity data characterizing activities of computer system elements from one or more computing devices of a monitored computing environment;
    generating, by the data processing system, a temporal graph of the activity data, wherein the temporal graph comprises nodes representing the computer system elements and edges connecting nodes, wherein each edge represents an event occurring between computer system elements represented by nodes connected by the edge;
    applying, by the data processing system, a filter to the temporal graph to generate one or more first vector representations, each vector representation characterizing nodes and edges within a moving window defined by the filter;
    applying, by the data processing system, the filter to a pattern graph representing a pattern of entities and events between entities indicative of the pattern of computing resource activity to be identified in the temporal graph, wherein application of the filter to the pattern graph creates a second vector representation;
    comparing, by the data processing system, the second vector representation to the one or more first vector representations to identify one or more nearby vectors in the one or more first vector representations; and
    outputting, by the data processing system, one or more subgraph instances corresponding to the identified one or more nearby vectors to an intelligence console computing system as inexact matches of the temporal graph.

2. The method of claim 1, further comprising training at least one graph neural network (GNN), based on a training dataset, to perform a vector embedding of attributes of the nodes and edges of an input graph to generate a vector output corresponding to the attributes of the nodes and edges of the input graph, and wherein applying the filter to the temporal graph comprises executing the trained at least one GNN on the temporal graph as the input graph, and wherein applying the filter to the pattern graph comprises executing the trained at least one GNN on the pattern graph as the input graph.

3. The method of claim 2, wherein the training dataset comprises one or more known activity graphs corresponding to activity performed by a known set of computing elements, at least one known pattern graph corresponding to at least one known pattern of activity of interest, and an indication of a correct vector output or classification to be generated by the at least one GNN based on the one or more known activity graphs and the at least one known pattern graph as inputs to the at least one GNN.

4. The method of claim 2, wherein the at least one GNN comprises a plurality of GNNs, each GNN having a different size corresponding filter, and wherein applying the filter to the temporal graph and applying the filter to the pattern graph comprises executing a GNN selected from the plurality of GNNs having a corresponding filter of a size corresponding to a size of the pattern graph.

5. The method of claim 1, wherein the filter has a first dimension corresponding to a reachability limit indicating a distance of nodes away from a first node within the moving window that are within the moving window, and a second dimension corresponding to a time range, from a time point corresponding to a center time point of the moving window, of events that are within the moving window.

6. The method of claim 1, wherein applying the filter to the temporal graph further comprises storing a mapping of portions of the one or more first vector representations to attributes of nodes and edges in the moving window, and wherein outputting the one or more subgraph instances corresponding to the identified one or more nearby vectors comprises converting the one or more nearby vectors to corresponding subgraph instances in the one or more subgraph instances based on the stored mapping.

7. The method of claim 1, wherein comparing the second vector representation to the one or more first vector representations to identify one or more nearby vectors in the one or more first vector representations comprises identifying the one or more nearby vectors based on an inexact matching of the second vector representation to portions of the one or more first vector representations to thereby identify the one or more nearby vectors.

8. The method of claim 1, wherein comparing the second vector representation to the one or more first vector representations to identify the one or more nearby vectors in the one or more first vector representations comprises, for each first vector representation in the one or more first vector representations:
    performing a vector distance based comparison of the second vector representation to the first vector representation to generate a similarity measure corresponding to the first vector representation;
    comparing the similarity measure to a threshold similarity measure to determine if the first vector representation represents a nearby vector; and
    in response to the similarity measure having a predetermined relationship relative to the threshold similarity measure, returning the first vector representation as a nearby vector.

9. A computer program product comprising a computer readable storage medium having a computer readable program stored therein, wherein the computer readable program, when executed on a data processing system, causes the data processing system to:
    receive activity data characterizing activities of computer system elements from one or more computing devices of a monitored computing environment;
    generate a temporal graph of the activity data, wherein the temporal graph comprises nodes representing the computer system elements and edges connecting nodes, wherein each edge represents an event occurring between computer system elements represented by nodes connected by the edge;
    apply a filter to the temporal graph to generate one or more first vector representations, each vector representation characterizing nodes and edges within a moving window defined by the filter;

apply the filter to a pattern graph representing a pattern of entities and events between entities indicative of the pattern of computing resource activity to be identified in the temporal graph, wherein application of the filter to the pattern graph creates a second vector representation;

compare the second vector representation to the one or more first vector representations to identify one or more nearby vectors in the one or more first vector representations; and output, by the data processing system, one or more subgraph instances corresponding to the identified one or more nearby vectors to an intelligence console computing system as inexact matches of the temporal graph.

10. The computer program product of claim 9, wherein the computer readable program further causes the data processing system to train at least one graph neural network (GNN), based on a training dataset, to perform a vector embedding of attributes of the nodes and edges of an input graph to generate a vector output corresponding to the attributes of the nodes and edges of the input graph, and wherein applying the filter to the temporal graph comprises executing the trained at least one GNN on the temporal graph as the input graph, and wherein applying the filter to the pattern graph comprises executing the trained at least one GNN on the pattern graph as the input graph.

11. The computer program product of claim 10, wherein the training dataset comprises one or more known activity graphs corresponding to activity performed by a known set of computing elements, at least one known pattern graph corresponding to at least one known pattern of activity of interest, and an indication of a correct vector output or classification to be generated by the at least one GNN based on the one or more known activity graphs and the at least one known pattern graph as inputs to the at least one GNN.

12. The computer program product of claim 10, wherein the at least one GNN comprises a plurality of GNNs, each GNN having a different size corresponding filter, and wherein applying the filter to the temporal graph and applying the filter to the pattern graph comprises executing a GNN selected from the plurality of GNNs having a corresponding filter of a size corresponding to a size of the pattern graph.

13. The computer program product of claim 9, wherein the filter has a first dimension corresponding to a reachability limit indicating a distance of nodes away from a first node within the moving window that are within the moving window, and a second dimension corresponding to a time range, from a time point corresponding to a center time point of the moving window, of events that are within the moving window.

14. The computer program product of claim 9, wherein the computer readable program further causes the data processing system to apply the filter to the temporal graph further at least by storing a mapping of portions of the one or more first vector representations to attributes of nodes and edges in the moving window, and wherein the computer readable program further causes the data processing system to output the one or more subgraph instances corresponding to the identified one or more nearby vectors at least by converting the one or more nearby vectors to corresponding subgraph instances in the one or more subgraph instances based on the stored mapping.

15. The computer program product of claim 9, wherein the computer readable program further causes the data processing system to compare the second vector representation to the one or more first vector representations to identify one or more nearby vectors in the one or more first vector representations at least by identifying the one or more nearby vectors based on an inexact matching of the second vector representation to portions of the one or more first vector representations to thereby identify the one or more nearby vectors.

16. The computer program product of claim 9, wherein the computer readable program further causes the data processing system to compare the second vector representation to the one or more first vector representations to identify the one or more nearby vectors in the one or more first vector representations at least by, for each first vector representation in the one or more first vector representations:

performing a vector distance based comparison of the second vector representation to the first vector representation to generate a similarity measure corresponding to the first vector representation;

comparing the similarity measure to a threshold similarity measure to determine if the first vector representation represents a nearby vector; and in response to the similarity measure having a predetermined relationship relative to the threshold similarity measure, returning the first vector representation as a nearby vector.

17. An apparatus comprising:
a processor; and
a memory coupled to the processor, wherein the memory comprises instructions which, when executed by the processor, specifically configures the processor to implement an inexact graph pattern matching mechanism that operates to:

receive activity data characterizing activities of computer system elements from one or more computing devices of a monitored computing environment;

generate a temporal graph of the activity data, wherein the temporal graph comprises nodes representing the computer system elements and edges connecting nodes, wherein each edge represents an event occurring between computer system elements represented by nodes connected by the edge;

apply a filter to the temporal graph to generate one or more first vector representations, each vector representation characterizing nodes and edges within a moving window defined by the filter;

apply the filter to a pattern graph representing a pattern of entities and events between entities indicative of the pattern of computing resource activity to be identified in the temporal graph, wherein application of the filter to the pattern graph creates a second vector representation;

compare the second vector representation to the one or more first vector representations to identify one or more nearby vectors in the one or more first vector representations; and output, by the data processing system, one or more subgraph instances corresponding to the identified one or more nearby vectors to an intelligence console computing system as inexact matches of the temporal graph.

18. The method of claim 1, wherein:
the temporal graph represents events occurring between nodes of the temporal graph as edges between the nodes for a series of time points,
the moving window defines a moving range of temporal points along the series of time points, and the one or more first vector representations are generated at least by performing a graph embedding operation on the nodes and edges within the range of temporal points specified by the filter.

19. The method of claim 18, wherein:

the one or more first vector representations each comprise a plurality of first vector slots having associated first values such that the plurality of first values specify a first vector representation of the nodes and edges within the moving range of temporal points, the one or more second vector representations each comprise a plurality of second vector slots having associated second values such that the plurality of second values specify the second vector representation of nodes and edges within the pattern graph, and comparing the one or more second vector representations to the one or more first vector representations to identify one or more nearby vectors comprises comparing at least one of the first values, corresponding to a first portion of the one or more first vector representations, to at least one of the second values, corresponding to a second portion of the one or more second vector representations, to identify a distance between the at least one of the first values and the at least one of the second values, and compare the distance to a threshold value to determine a similarity measure of the at least one first values to the at least one second values.

20. The method of claim 19, wherein first portion and second portion are determined to be matching in response to the similarity measure having a predetermined relationships relative to a threshold value, and wherein outputting the one or more subgraph instances comprises performing a lookup operation in a mapping table that maps the first values to corresponding nodes/edges in the temporal graph, and identifying the nodes/edges corresponding to first portions of the one or more first vector representations that are determined to be matching the second portion.

* * * * *